US011101872B2

(12) United States Patent
Ho

(10) Patent No.: US 11,101,872 B2
(45) Date of Patent: Aug. 24, 2021

(54) HIGH GAIN SINGLE LENS REPEATER PLATFORM

(71) Applicant: Amphenol Antenna Solutions, Inc., Rockford, IL (US)

(72) Inventor: Jimmy Ho, Hickory, NC (US)

(73) Assignee: Amphenol Antenna Solutions, Inc., Rockford, IL (US)

( * ) Notice: Subject to any disclaimer, the term of this patent is extended or adjusted under 35 U.S.C. 154(b) by 0 days.

(21) Appl. No.: 16/822,778

(22) Filed: Mar. 18, 2020

(65) Prior Publication Data

US 2021/0091847 A1 Mar. 25, 2021

Related U.S. Application Data

(60) Provisional application No. 62/904,317, filed on Sep. 23, 2019.

(51) Int. Cl.
*H04B 7/155* (2006.01)
*H01Q 15/02* (2006.01)

(52) U.S. Cl.
CPC ............. *H04B 7/155* (2013.01); *H01Q 15/02* (2013.01)

(58) Field of Classification Search
CPC .................. G01S 13/767; G10L 15/20; G10L 2021/02082; H01Q 15/08; H01Q 19/062; H01Q 25/008; H01Q 3/242
USPC .......... 455/7, 11.1, 24, 456.2, 509; 370/280, 370/329; 342/11; 343/817; 356/51; 359/337, 726
See application file for complete search history.

(56) References Cited

U.S. PATENT DOCUMENTS

| | | | |
|---|---|---|---|
| 6,169,910 B1 * | 1/2001 | Tamil | G01S 13/767 342/11 |
| 6,795,655 B1 * | 9/2004 | Sidorovich | H04B 10/1125 398/118 |
| 7,429,953 B2 | 9/2008 | Buris et al. | |
| 7,822,427 B1 * | 10/2010 | Hou | H04W 36/385 455/456.2 |
| 10,003,168 B1 * | 6/2018 | Villeneuve | G02B 27/10 |
| 10,348,051 B1 * | 7/2019 | Shah | H01S 3/06712 |
| 2003/0169516 A1 * | 9/2003 | Sekiyama | G02B 26/0825 359/726 |
| 2004/0249311 A1 * | 12/2004 | Haar | A61B 5/14532 600/584 |

(Continued)

FOREIGN PATENT DOCUMENTS

| | | |
|---|---|---|
| EP | 1071160 A2 | 1/2001 |
| EP | 3393964 A2 | 10/2018 |
| WO | WO-2019/087525 A1 | 5/2019 |

OTHER PUBLICATIONS

H. D. Hristov, et al., "Improving Indoor Signal Coverage by Use of Through-Wall Passive Repeaters", IEEE, 2001, pp. 153-161.

(Continued)

*Primary Examiner* — Tan H Trinh
(74) *Attorney, Agent, or Firm* — Blank Rome LLP

(57) ABSTRACT

A repeater has a spherical dielectric lens antenna, a donor feed unit supporting transmission and reception of signals through the lens antenna, a service feed unit supporting transmission and reception of signals through the lens antenna, and at least one interconnecting guided transmission medium providing a radio frequency transmission path between the donor feed unit and the service feed unit.

16 Claims, 24 Drawing Sheets

(56) References Cited

U.S. PATENT DOCUMENTS

| | | | | |
|---|---|---|---|---|
| 2006/0085160 | A1* | 4/2006 | Ouchi | H01Q 1/38 |
| | | | | 702/150 |
| 2008/0174771 | A1* | 7/2008 | Yan | G01N 21/8901 |
| | | | | 356/237.5 |
| 2008/0293360 | A1* | 11/2008 | Maslennikov | H04B 7/15578 |
| | | | | 455/24 |
| 2009/0010215 | A1* | 1/2009 | Kim | H04W 72/085 |
| | | | | 370/329 |
| 2009/0058752 | A1* | 3/2009 | Lee | H01Q 21/062 |
| | | | | 343/817 |
| 2011/0110277 | A1* | 5/2011 | Rausch | H04B 1/46 |
| | | | | 370/280 |
| 2013/0310098 | A1* | 11/2013 | Baligh | H04L 5/0028 |
| | | | | 455/509 |
| 2014/0268105 | A1* | 9/2014 | Bills | G01N 21/453 |
| | | | | 356/51 |
| 2015/0249311 | A1* | 9/2015 | Rowen | H01S 3/06758 |
| | | | | 359/337 |
| 2017/0084994 | A1* | 3/2017 | Tran | H01Q 21/20 |
| 2017/0117926 | A1* | 4/2017 | Kim | H01P 1/383 |
| 2017/0324171 | A1 | 11/2017 | Shehan | |
| 2018/0102590 | A1* | 4/2018 | Ebberg | H01Q 15/14 |
| 2019/0154439 | A1* | 5/2019 | Binder | G01S 15/08 |
| 2019/0319756 | A1* | 10/2019 | Moshfeghi | H04W 88/02 |
| 2020/0333682 | A1* | 10/2020 | Ataei | G02B 27/0977 |

OTHER PUBLICATIONS

H. Ren, et al., "Design of a Millimeter-Wave Cylindrical Luneberg Lens Antenna with Multiple Fan-Beams", IEEE, 2017, 3 pgs.

H. Schrank, et al., "A Luneberg-Lens Update", Antenna Designer's Notebook, IEEE Antennas and Propagation Magazine, vol. 37, No. 1, Feb. 1995, pp. 76-79.

R. K. Luneburg, "Mathematical Theory of Optics", Jan. 1, 1964, 1 pg.

International Search Report & Written Opinion for PCT/US2020/050877, dated Feb. 12, 2021, 18 pgs.

* cited by examiner

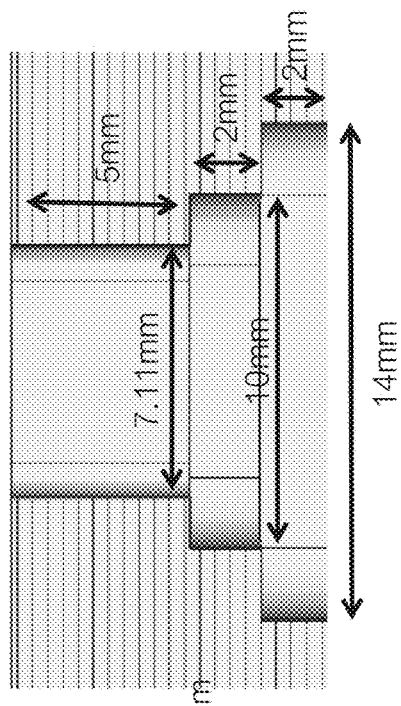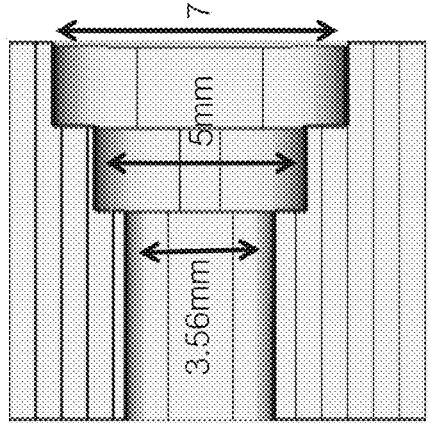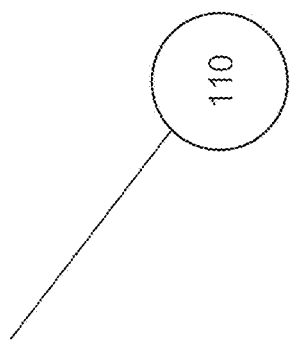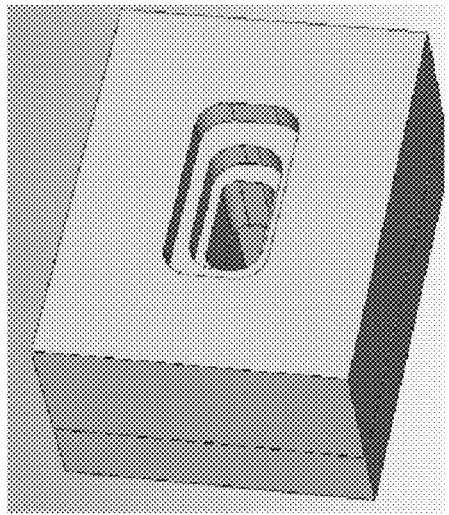
Figure 16 (a) Figure 16 (b) Figure 16 (c)

Figure 17
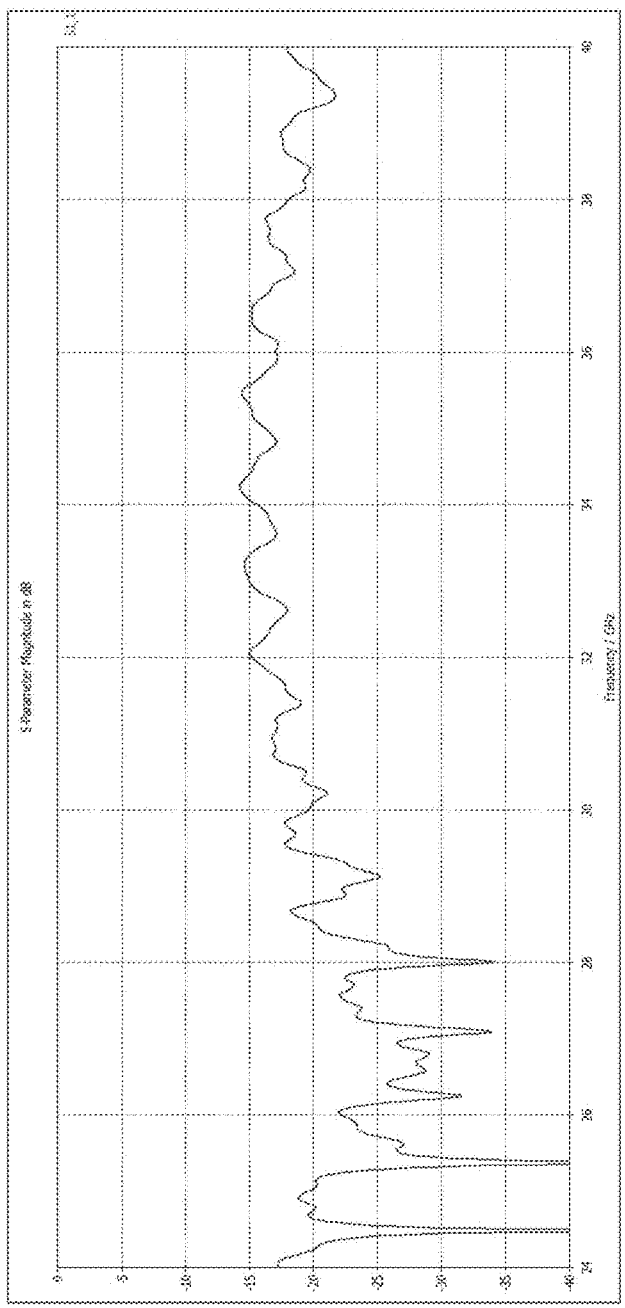
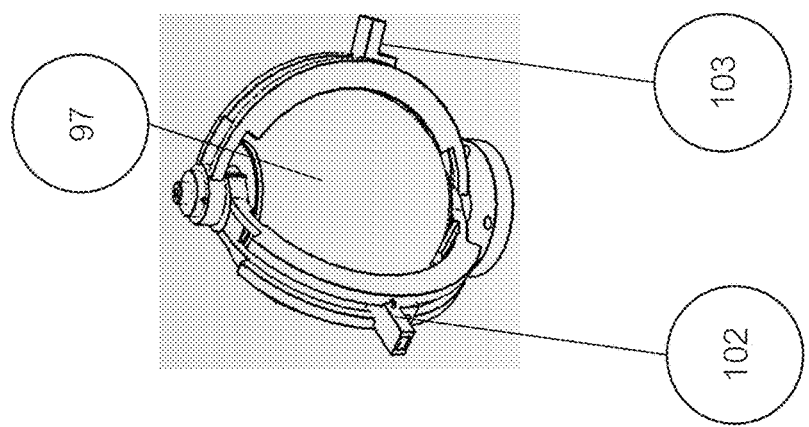

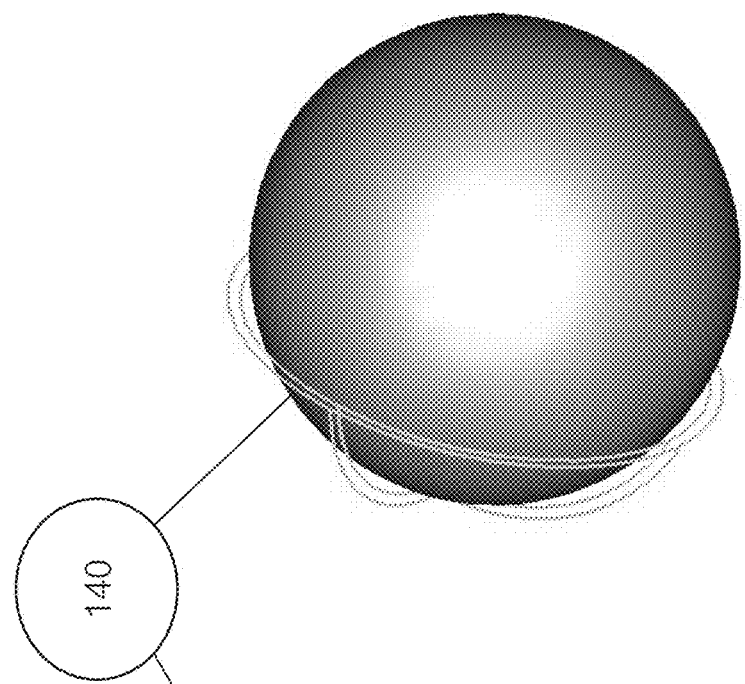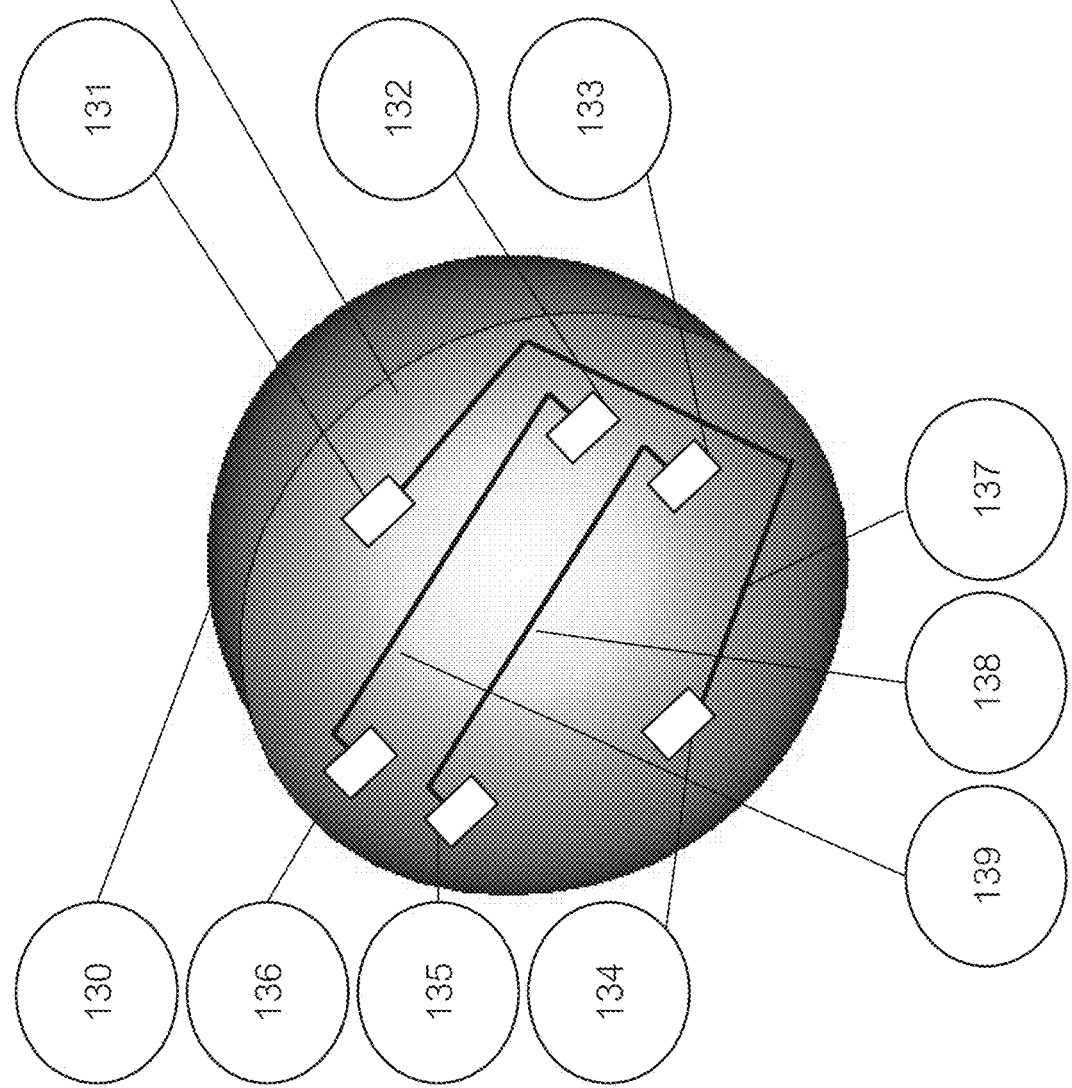

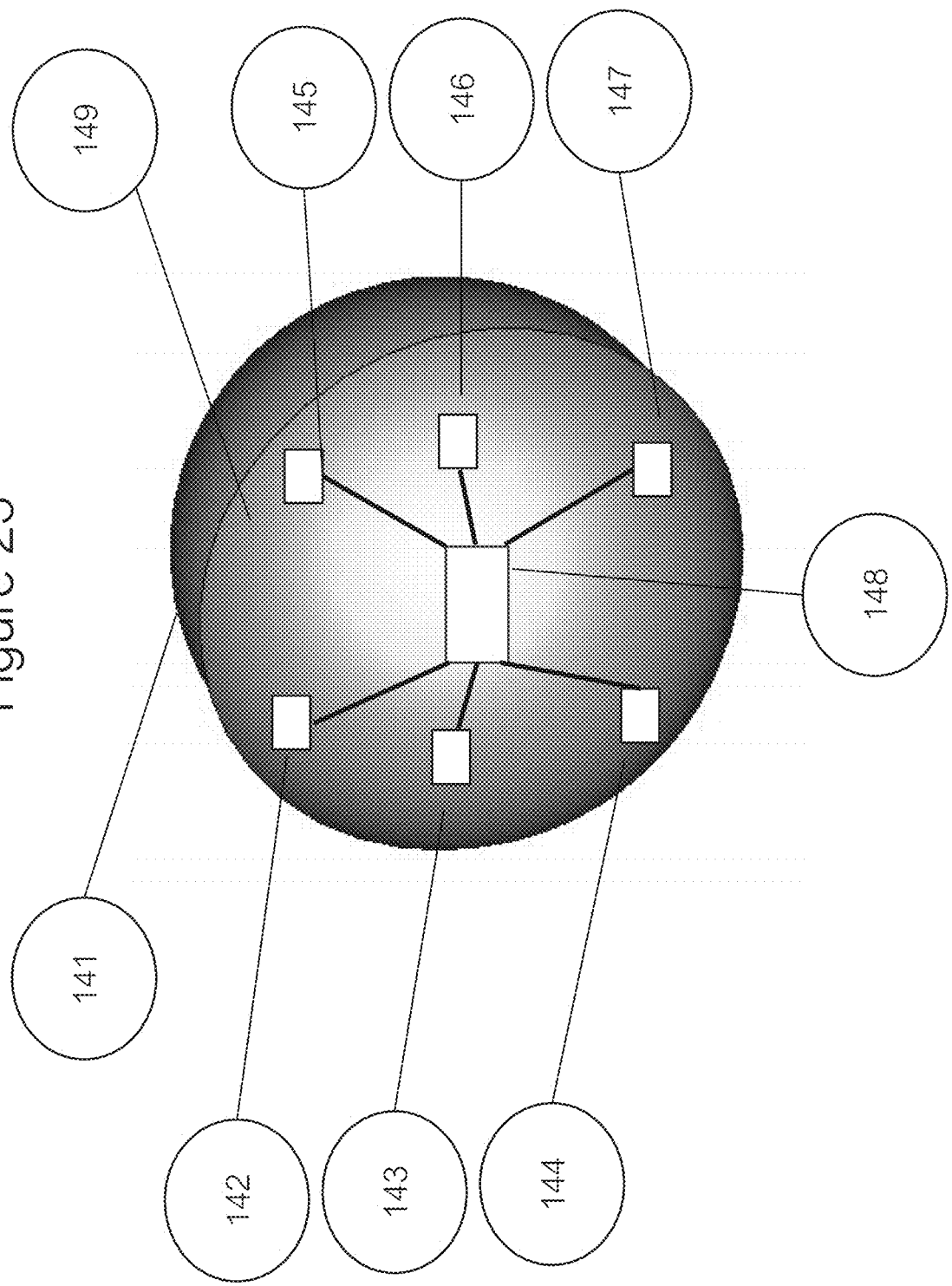

HIGH GAIN SINGLE LENS REPEATER PLATFORM

CROSS-REFERENCE TO RELATED APPLICATIONS

This application claims the benefit of priority of U.S. Application Ser. No. 62/904,317 filed on Sep. 23, 2019 and entitled "High Gain Single Lens Repeater Platform," the content of which is relied upon and incorporated herein by reference in its entirety.

BACKGROUND

The present disclosure relates to a wireless communication system and in particular, a simple, highly efficient, high gain repeater with low visual impact that can be mounted on a street corner or lamppost to provide high data rate communications in a 5G network. These repeaters, which have a single lens antenna, extend the coverage area of a millimeter-wave (mm-wave) base station and deliver high data rate communications. The device has a single lens antenna and may be used to provide either a passive repeater, containing no electronic circuits or an active repeater containing signal amplifying circuits.

It is well known that the coverage area of a mobile radio base station may be extended by means of arrangements known as repeaters. These are commonly employed to add coverage in areas in which transmission from a base station is blocked by buildings, trees or other obstacles. A repeater according to prior art typically has a donor antenna whose function is to transmit signals to and from a base station, and a second antenna referred to as a service antenna whose function is to communicate with users in the extended area of coverage. Both the donor antenna and the service antenna transmit and receive radio signals. An arrangement in which the donor and service antennas are directly connected by radio frequency transmission lines is known as a passive repeater. An arrangement in which the donor and service antennas are connected through radio frequency circuit arrangements such as amplifiers are known as active repeaters. At frequencies greater than 6 GHz, now being developed for mobile radio use, the propagation characteristics of radio waves becomes similar to that of light, so propagation within city areas becomes problematic; a signal directed along a city street will not propagate into side streets, even one close to the base station, so the use of repeaters becomes an essential tool for the provision of adequate coverage.

EP1071160A2 describes a typical active repeater system that has a donor antenna that is used to communicate with a base station and a service antenna to communicate with users. The donor antenna and service antenna are physically separate devices, mounted in different enclosures. The connection between these antennas includes a bidirectional amplifier. This requires three different units (ie a donor antenna, the amplifier electronics and a service antenna. This arrangement is adopted to enable the arrangement to be adaptable to provide any desired angle between the donor antenna and the service antenna. The arrangement of the two antennas must be such as to provide isolation between them in order to avoid feedback between the transmitted and received signals which are typically on the same frequency.

U.S. Pat. No. 7,429,953B2 describes a passive repeater system using a thin flexible circuit material to connect two antenna arrays realized using printed circuit techniques. Structures such as elevators or rooms with solid walls act as barriers that prevent mm-wave signals from propagating through them and this small passive repeater allows the signal to propagate through the wall by means of the provided radio frequency transmission line and connect to the user by means of the antenna on the other side of the wall. There is no concern regarding feedback or isolation between the donor and the service antennas. Provided that the signal power is higher in the room than it would have been without the repeater, the coverage of the base station has been extended.

A further such arrangement is described in "Improving indoor signal coverage by use of through-wall passive repeaters", H. D. Hristov, R. Feick, and W. Grote (Conference record, IEEE Antennas and Propagation Society International Symposium 2001, Volume 2, pp 158-161, IEEE, New York, 2001).

At mm-wave frequencies (26 GHz-300 GHz), the signal attenuation of cables and printed circuit antennas are very high, leading to poor efficiency in the antenna and a further reduction as the signal passes thorough the transmission line connecting the donor antenna to the service antenna. As an example, the measured losses of in a feed network using a high quality substrate material at 39 GHz for a 12×12 array with a 3 dB beamwidth of 6.4° is 5.4 dB. These losses reduce the useful coverage distance of the repeater. A 6 dB loss reduces the possible coverage distance by half.

Spherical lens antennas are known in prior art, an example being the Luneberg lens antenna (R. K. Lüneberg, "Mathematical Theory of Optics", Brown University, Providence, R.I., 1944, pp. 189-213.). The classical Luneberg lens is a sphere of dielectric material having a dielectric constant that is a function of the radius, decreasing from the center to the outside surface. A wave approaching the lens from any direction is focused at a point on the opposite surface of the lens, so a feed unit in the surface of the sphere creates a collimated beam emerging from the opposite side of the lens. By providing multiple feed units, Luneberg lenses have been used to provide multiple beams from a single lens (for example: J. R. Sanford, "A Luneberg lens update", IEEE Antennas and Propagation Magazine, Vol. 37, No. 1, IEEE, New York, 1995). They may also be realized in cylindrical form (for example: H. Ren, S. Yang, and S. Qu, "Design of A Millimeter-Wave Cylindrical Luneberg Lens Antenna with Multiple Fan-Beams", Proceedings of the 6th Asia-Pacific Conference on Antennas and Propagation, IEEE, New York, 2017).

US2017/0324171 discusses the use of a lens using a plurality of radiating elements placed around the exterior surface of the lens to generate multiple high gain beams for 5G wireless communications.

No admission is made that any reference cited herein constitutes prior art. Applicant expressly reserves the right to challenge the accuracy and pertinence of any cited documents.

Although mm-wave solutions offer much larger bandwidths and consequent higher data rates than can be provided in the sub-6 GHz bands used for today's mobile wireless communications, their use has many drawbacks. Firstly, the propagation attenuation is much higher and as a result, mm-wave systems can only deliver communications signals over only a relatively short distance (a few hundred meters) as opposed to several kilometers for a sub-6-GHz system. Since the propagation distance of mm-wave systems is very short and signals do not propagate beyond line-of-sight, to cover all the streets in a typical city, a mobile radio network would require many base stations. Unfortunately, base stations are not only costly, but it is difficult to find the space to install the radio equipment and each installation requires the provision of power and a communications link to network. The provision of effective low-cost repeaters can therefore make a great impact on the cost of providing the required coverage, especially in dense urban areas. The use of passive repeaters is particularly attractive because they operate with no external source of power.

Given the number of streets and street corners in a typical city and the short line-of-sight propagation distance available from mm-wave systems, a low cost but highly efficient, high gain passive repeater with low visual impact is required, suitable for mounting on street corners, lampposts and other street furniture, delivering coverage to areas that otherwise cannot be accessed without the use of multiple base stations. The disclosure reduces dramatically the cost of deployment of mm-wave wireless service as the number of required base stations is reduced with the introduction of the disclosed passive repeater into the network topography.

There exists a need for an inexpensive but high performance repeater solution to redirect signals around corners, remain unobtrusive and to substantially reduce connection losses between the donor and service antennas.

Base stations for mobile radio services typically transmit and receive radio frequency signals having 45-degree slant linear polarization. For the sake of simplicity, patch, dipole elements or waveguide horns are illustrated herein as having vertical polarization, but it will be understood that by orienting dipoles appropriately they may have slant or horizontal polarization. Crossed dipole or patch elements may be used in place of vertical dipoles to provide dual slant polarization or circular polarization.

FIG. 1 shows a typical passive repeater arrangement for high data rate millimeter-wave application according to prior art wherein a base station 1 having an antenna system 2 communicates by means of signal path 3 with a donor antenna 4 mounted on a structure 5 which may be a building or other existing infrastructure. The donor antenna 4 is connected to a service antenna 6 by means of a radio frequency transmission line 7 which may for example be in the form of coaxial cable or waveguide. Donor antenna 4 is mounted to structure 5 by a bracket 9 and service antenna 6 is mounted to the structure 5 by bracket 10. The service antenna 6 communicates with a user device 8 by means of transmission path 11. The signal attenuation between the base station antenna 2 and the user device 8 is dependent on the lengths of the transmission paths 3, 11, the gain of the antennas 4, 6, the attenuation of the transmission line 7 and the operating frequency.

In the description herebelow the beam formed by the antenna communicating with the base station (usually referred to as the donor antenna) is referred to as the donor beam. Correspondingly the beam of the antenna communicating with user devices (usually referred to as the service antenna) is referred to as the service beam. Both donor beams and service beams provide for both the transmission and reception of radio signals in the assigned frequency ranges. The angular widths of the donor and service beams are chosen by design; they may be substantially equal but may be chosen to be different according to the area to be covered by the service beam.

FIG. 2 shows a plan view of a block of streets in a typical city block. A base station 12 transmits a mm-wave signal 13 along street 14. At millimeter-wave frequencies this signal typically has an effective range of typically only a few hundred meters or a couple of city blocks. Because of the restriction of millimeter-wave propagation to line-of-sight, there will be no coverage along the side street 15, therefore to provide coverage to street 15, a further base station 16 is required, providing beam 17.

FIG. 3 shows the same view of a block of streets in a typical city block as in FIG. 2. However, in this case, a repeater system 18 configured according to prior art, having a donor antenna 19 and a service antenna 20, provides a donor beam 21 and a service beam 22 along the side street 15, thereby eliminating the need for base station 12 shown in FIG. 2.

FIG. 4 shows an enlarged view of the repeater arrangement 18 according to prior art. A donor antenna 19 accommodated in a housing 23 communicates with the base station by means of donor beam 21. A coaxial cable 24 connects the donor antenna 19 to the service antenna 20, passing through hinge arrangement 25. The service antennas 20 accommodated in housing 26 communicates with user devices by means of service beam 22.

At a frequency of 28 GHz, an antenna array using high quality microwave laminate with a loss tangent of 0.0018 is approximately 33% efficient, Most of the losses are in the feed network linking the radiating elements together. A 16-element×16-element array provides a 3 dB beamwidth in both the elevation and azimuth planes of approximately 5.4 degrees. Additional loss arises from link cable 24 connecting donor antenna 19 to service antenna 20. For the cable used at this frequency, this loss is typically 3.9 dB per meter. It is therefore necessary to use the minimum possible length of cable to connect antennas 19, 20, and a total cable loss of 2 dB is typical.

FIG. 5 shows an example of a prior art lens antenna 27 wherein feed unit 28 having a low gain horn antenna, having a large beamwidth, illuminates lens 29 to provide a collimated beam 30. The arrangement is completely bidirectional, so excitation of the feed unit results in an outgoing collimated beam, and a plane wave approaching the lens is focused onto the feed unit. The arrangement functions as a high gain antenna providing a narrow beam pattern 30 and has a calculated efficiency of over 80%. This is a significant improvement over the printed circuit array antenna shown in FIG. 4 which was only 33% efficient.

SUMMARY

The present disclosure provides for a repeater comprising a single substantially spherical lens provided with at least two interconnected feed units, each having independently adjustable positions in both azimuth and elevation. This compact, low cost arrangement provides for the reception and redirection of signals at arbitrary angles that may be determined at the time of installation to suit the requirements of each repeater location. Any of the repeaters described below may be passive, with directly interconnected feed units; alternatively, it may be active, with bidirectional amplifiers positioned between donor and service feed units.

The operation of radio systems and antennas is bidirectional, providing for both the transmission and reception of radio signals. Passive antennas are reciprocal devices, that is the gain and radiation patterns of an antenna at a given frequency are identical irrespective of whether the antenna is transmitting or receiving a radio signal. In the following description, references to the transmission of signals shall be taken to include their reception and vice versa.

An aspect of this disclosure is a repeater having a substantially spherical dielectric lens, a donor feed unit supporting transmission and reception of signals through said lens, a service feed unit supporting transmission and reception of signals through said lens, and at least one interconnecting guided transmission medium providing a radio frequency transmission path between said donor feed unit and said service feed unit.

In another aspect of this disclosure, the repeater has a substantially spherical dielectric antenna, at least one donor feed unit supporting transmission and reception of signals through said lens antenna, at least one service feed unit supporting transmission and reception of signals through said lens antenna, a passive radio frequency power division network having at least one input port and a plurality of output ports, the at least one input port being mutually coupled to each of the plurality of output ports and the plurality of output ports being mutually isolated from one another, a first guided transmission medium having a first end connected to a donor feed unit and a second end connected to an isolated port of the said power divider, and a further set of guided transmission media each having a first end connected to a service feed unit and a second end connected to an isolated port of said power divider.

In some examples, the repeater has at least one amplifying device or electronic circuit arrangement connected by at least one of the said guided transmission media. In some examples, a first service feed unit forming a first service beam in a first direction and a second service feed unit forming a second service beam in a second direction different from the first direction. In some examples, said donor feed is placed around an outer profile of the lens to form a donor beam in any direction. In some examples, said service feed can be placed around an outer profile of the lens to form a service beam in any direction. In some examples, at least one array with circuit arrangements at either or both of the donor and service feeds to provide beamforming and beam steering capabilities. In some examples, a plurality of donor feed units and a plurality of service feed units are disposed at a surface of the spherical dielectric lens antenna, each donor feed unit being connected by a guided transmission medium to at least one service feed unit, thereby concurrently providing multiple donor beams and multiple service beams. In some examples, at least one donor feed unit and at least one service feed unit are connected by a guided transmission medium to a switching arrangement thereby enabling the routing of signals between said donor feed units and service feed units to be selected as required to meet changing operational requirements.

Another aspect of this disclosure, the repeater includes a first lens provided with at least one donor feed unit and forming therewith at least one donor beam, a second lens provided with at least one service feed and forming therewith at least one service beam, and at least one guided transmission medium extending through an object, each of said guided transmission media having a first end connected to one of said at least one donor feed unit and a second end connected to one of said at least one service feed unit.

In another respect of this disclosure, the repeater has a substantially spherical dielectric lens, at least one donor feed unit supporting transmission and reception of signals through said lens; and connected by a guided transmission medium to at least one further antenna supporting the transmission and reception of service signals, wherein the said service antenna is a separate antenna independent of the said spherical antenna.

In a certain example, the guided transmission media comprise one or more of a rigid waveguide, a flexible waveguide, a coaxial cable or a microstrip transmission line. In some examples, the substantially spherical lens is provided with a surface matching layer having a permittivity arranged to enhance the matching between the said lens and said feed units. In some examples, the material forming the lens is arranged to have a permittivity which varies as a function of a radius from the center of the lens. In some examples, the material forming the lens has a constant permittivity. In some examples, the lens has a truncated substantially spherical shape. In some examples, the lens has a substantially cylindrical shape.

Lenses with perfect spherical or cylindrical shape may provide optimum performance in terms of technical parameter such as gain, radiation patterns and cross polar performance. However, lenses with deviations from ideal geometry will also operate as described, though generally with some reduction in their technical parameters. The impact of deviations on technical performance is a complex function of the area and radius of any deviations as a fraction of the operating wavelength. While a small reduction in gain may be compensated by the use of a larger lens, other degradations in technical parameters may be less easy to compensate and may impact performance within the radio network. The terms "substantially spherical" and "substantially cylindrical" as used herein are to be taken to imply that while the shape described is not geometrically perfect, any deviations are such that functional performance is provided to a degree acceptable in radio network planning.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 16(a) shows an external view of a wideband feed unit having a waveguide with internal matching steps;

FIG. 16(b) is a cross-section of the feed unit of FIG. 16(a) as seen from the side showing internal dimensions;

FIG. 16(c) is a further cross-section of the feed unit of FIG. 16(a) as seen from the top showing further internal dimensions;

FIG. 17 is a graph showing the simulated return loss from 24 GHz-40 GHz of either the donor antenna feed with the lens or the service antenna feed with the lens prior to connecting them together to form a repeater;

FIG. 22(a) shows a spherical lens provided with a plurality of feed units in the form of patch antennas connected together in pairs to provide multiple independent donor and service beams from a single lens;

FIG. 22(b) shows an arrangement provided to support the patch antennas of FIG. 22(a);

FIG. 23 shows an arrangement whereby a plurality of patch antenna feed units are connected together by means of a switch matrix, enabling the configuration of donor and service beams to be controlled in accordance with network traffic requirements.

DETAILED DESCRIPTION

In the description here below many references are made to the means by which radio frequency devices such as antennas may be connected together to enable the flow of radio frequency signals between them. These are generically referred to herein as "guided transmission media", which may take the form of coaxial cables, rigid waveguide, flexible waveguide, or any other convenient form of radio frequency transmission line, or may be provided by a combination thereof.

The standard designation of base stations differs for each generation of mobile radio air interfaces. The 2G term is a BTS, the 3-G term is a Node-B, the 4-G term is an eNode-B or HeNB, and the 5-G term is a gNB. The antennas disclosed herein operate with any air interface, so the general term "base station" is used herebelow to refer to any of these generational forms of base station.

Figure 1:
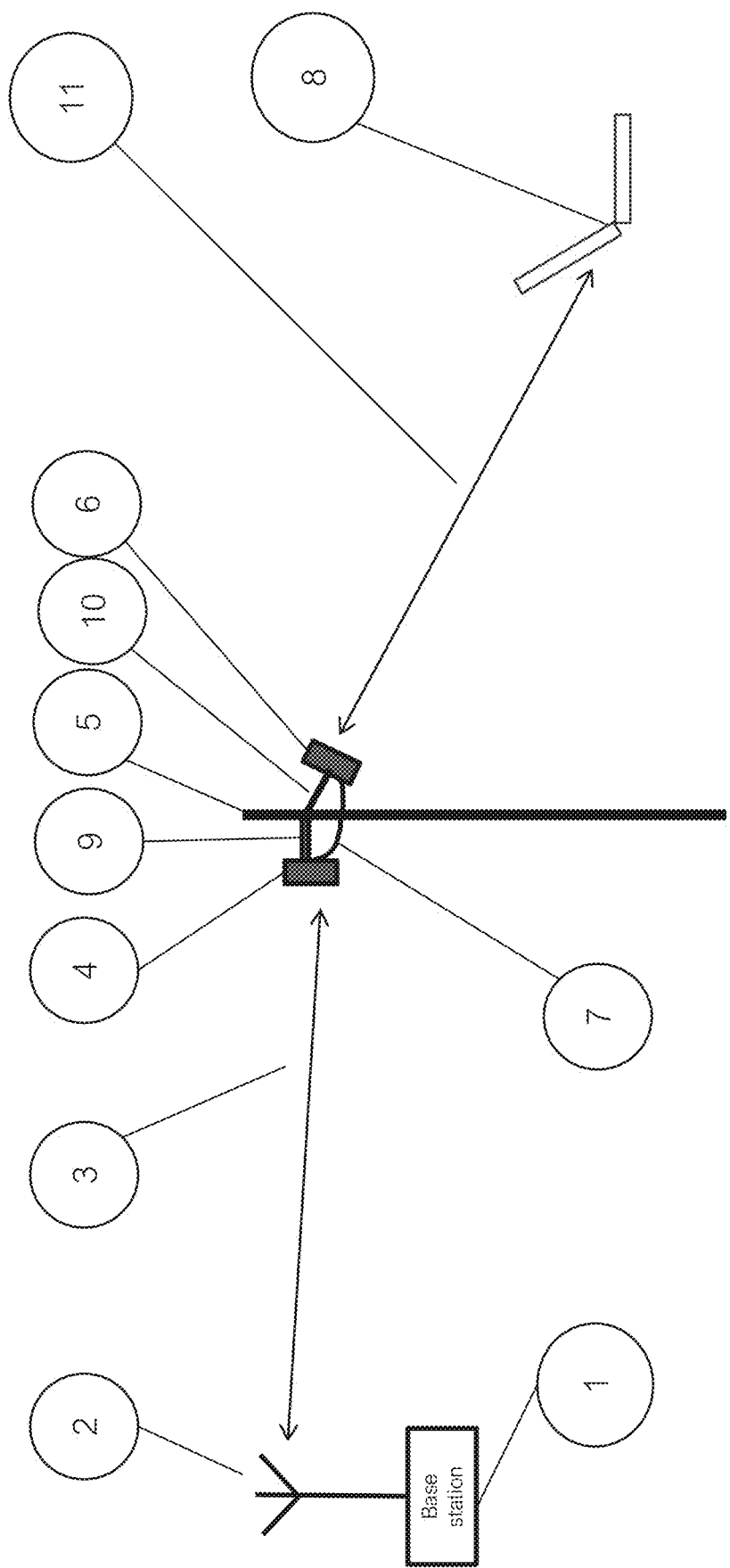
FIG. 1 is a diagram showing a prior art arrangement of a passive repeater system.
Figure 2:
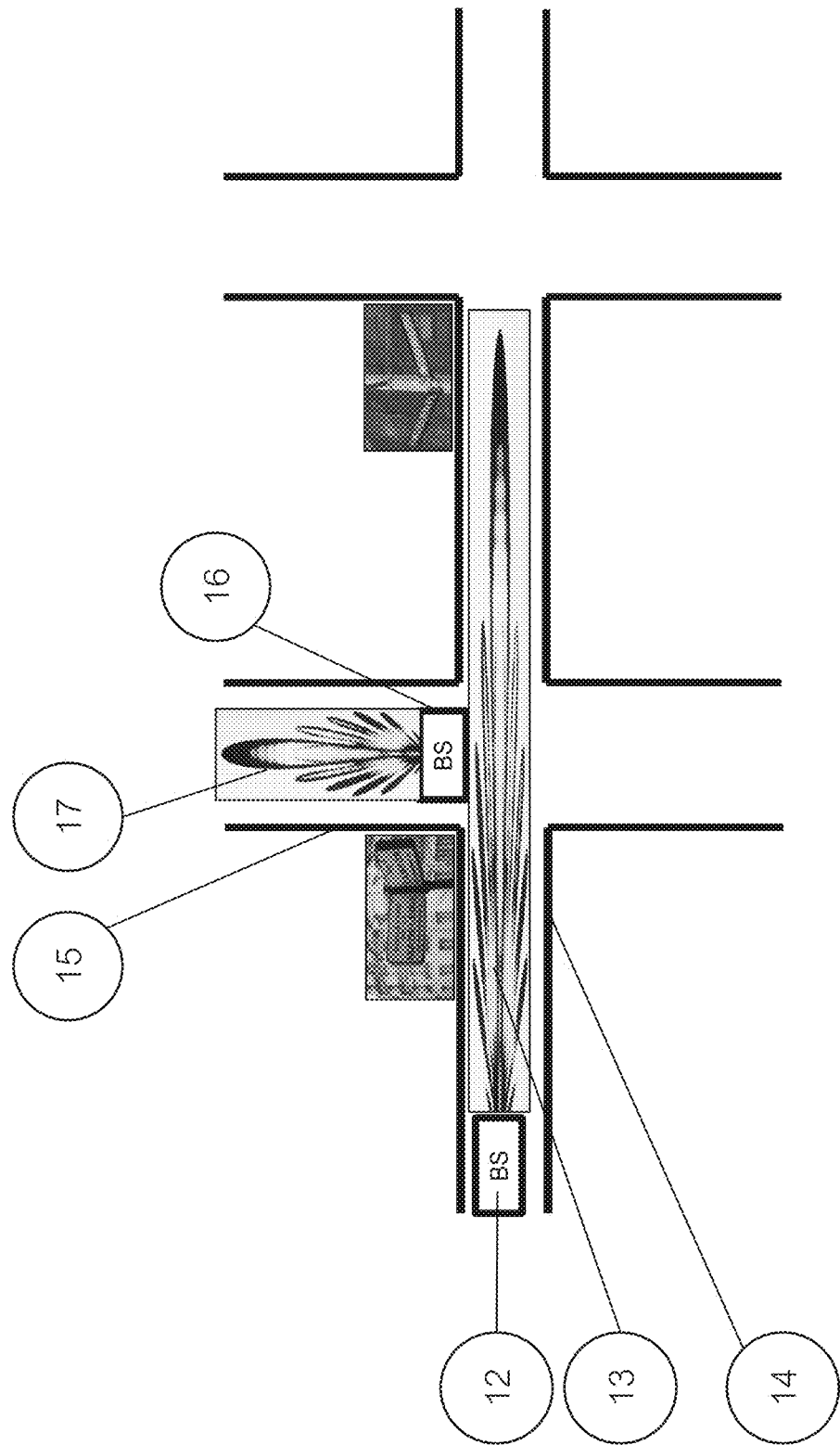
FIG. 2 is a diagram showing a plan view of a block of city streets with two base stations and signals generated from there to provide coverage to a main street and a side street.
Figure 5:
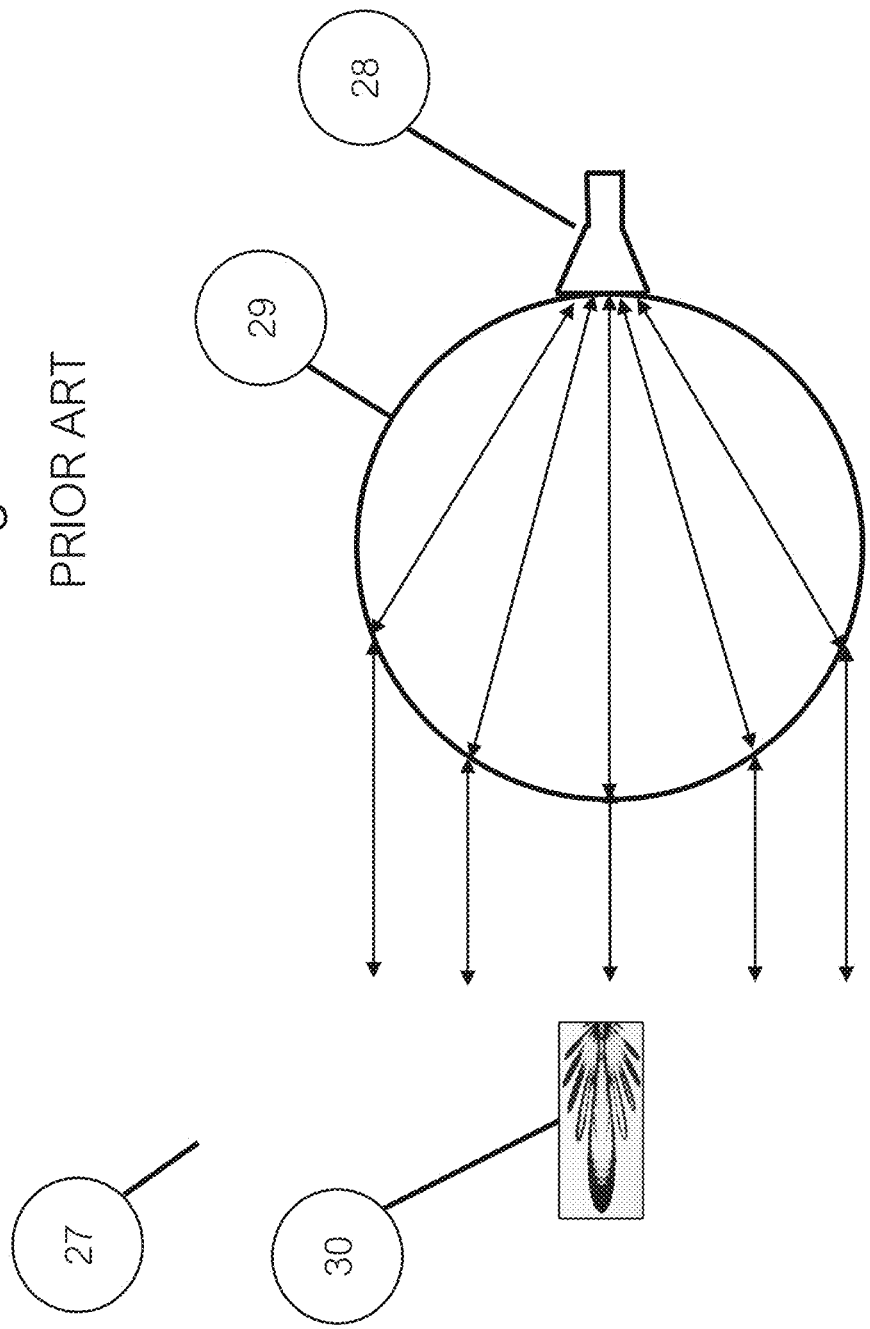
FIG. 5 shows prior art arrangement of a lens and a feed unit, in this case shown as a horn.
Figure 6:
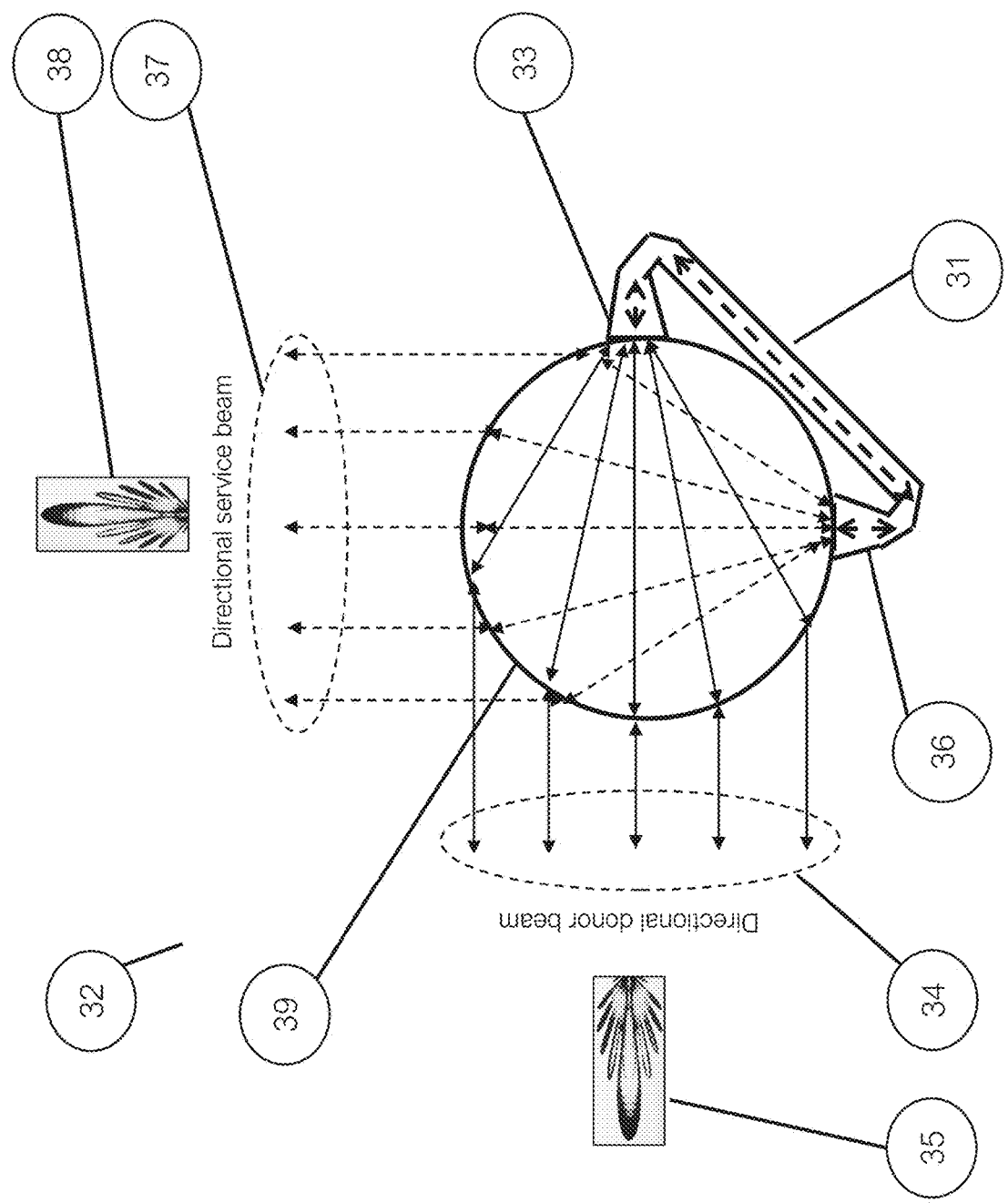
FIG. 6 shows an embodiment of the disclosure where interconnected donor and service feed units transmit and receive signals through the same lens.

FIG. 6 shows a first embodiment of the disclosure wherein a substantially spherical lens 39 is provided with two feed units connected together by a guided transmission medium 31, here shown as a waveguide. The lens and the feed units, as well as other necessary hardware, form an antenna. Each feed unit provides a beam emerging from the opposite side of the lens and directed radially therefrom. Energy received from the base station by donor beam 35 is focused by lens 39 on feed unit 33, passes by way of guided transmission medium 31 to feed unit 36 and is radiated as service beam 37. In a similar manner, energy received by feed unit 36 is radiated by feed unit 33 in service beam 34. Each beam emerges on the opposite side of the lens from the feed unit that creates it. This configuration transforms the lens antenna of FIG. 5 into a simple high gain, low loss passive repeater system 32 able to perform the same task as the repeater systems shown in FIG. 1 and FIG. 4 but with greater efficiency.

The ray paths illustrated in FIG. 6 are shown to aid the understanding of the operation of the lens and the associated feed units, and are a simplified approximation to the underlying physics. Feed unit 33 provides bidirectional donor beam 34, having typical far field radiation pattern diagrammatically represented as 35. Feed unit 36 provides bidirectional service beam 37, having typical radiation pattern diagrammatically represented as 38. Guided transmission medium 31, preferably in the form of a flexible waveguide, connects feed units 33 and 36.

Figure 4:
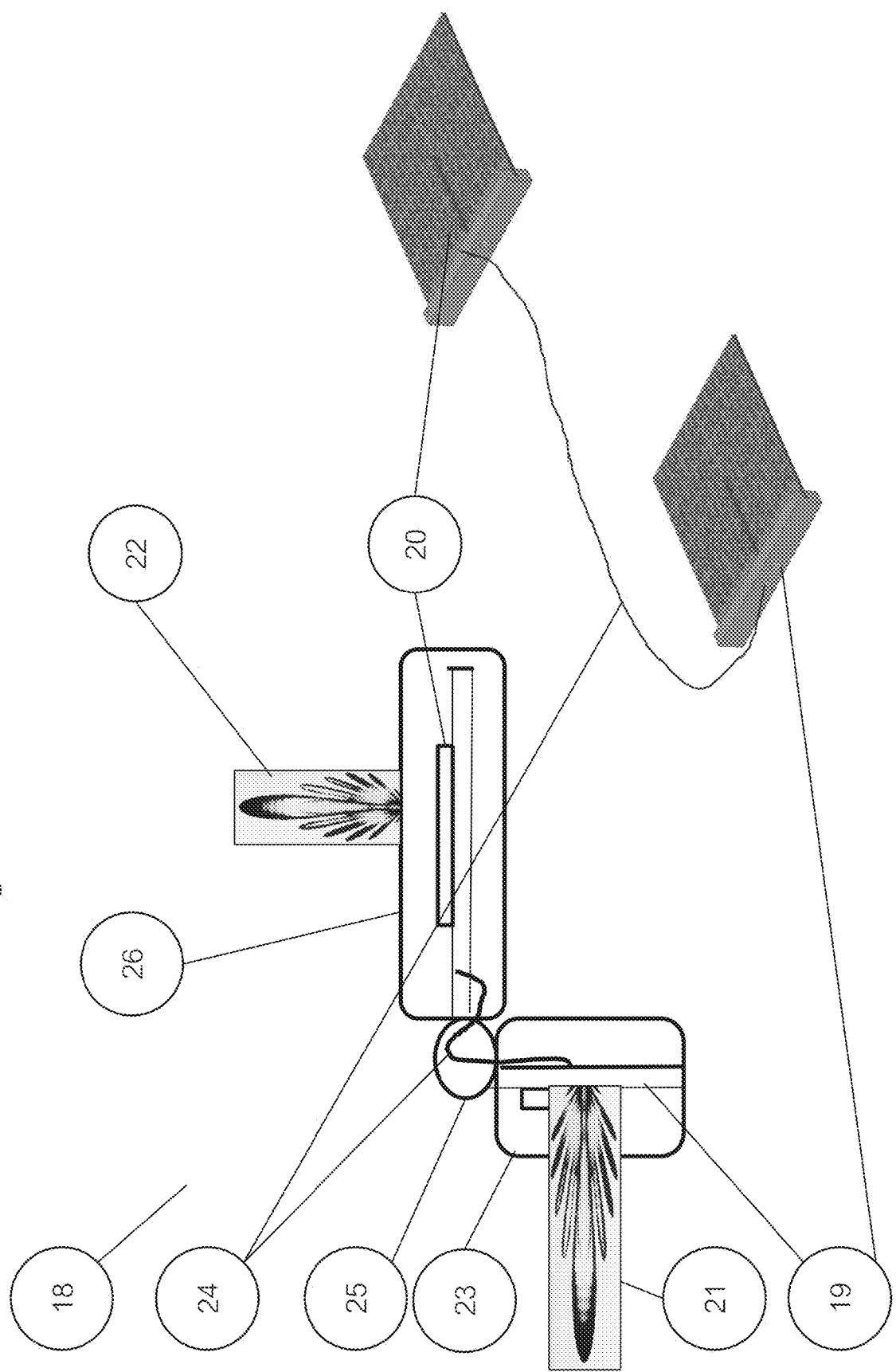
FIG. 4 shows a prior art example of a passive repeater equipped with separate donor and service antennas.

It will be appreciated that the repeater 32 equipped with a single lens 39 with two feed units 33, 36 is significantly smaller, less conspicuous and of lower cost than the prior art two-antenna repeater configuration of FIG. 4 which it replaces. The repeater 32 may be mounted on street furniture and arranged to resemble a street light or camera.

In FIG. 6 feed units 33, 36 are mounted such that the angle between the donor beam 34 and the service beam 37 is substantially 90 degrees. However, it will be appreciated that other relative locations for the feed units may be selected, providing other angles between the donor and service beams. This choice is not restricted to the relative azimuth angle, but by appropriate choice of the feed unit position, the angle between the donor and service beams may be selected in both the azimuth and elevation planes. The relative location of feed units is restricted by mechanical interference if the feed units are mounted too closely together so the angle between donor and service beams may range from 20 degrees to 170 degrees.

In FIG. 6 the feed units 33, 36 are shown in the form of a waveguide horn having a forward opening that faces the outer surface of the lens 39. Other formats for the feed unit are possible, including but not limited to simple open-circuit waveguides, patch radiators, dipoles or arrays thereof. The face of the feed unit proximate to the lens may be shaped to conform to the outer surface of the lens. The feed unit can be placed on (i.e., touch) the lens surface or some distance away from the lens. For the case of a graded dielectric lens (i.e., the lens dielectric constant varies from the center of the lens to the surface of the lens), the focal point can be on the surface of the lens. For the constant dielectric lens, the focal point is a short distance from the lens. The focal point is where all the rays of an incoming signal are focused. For a constant dielectric lens (described in this application), the focal point from the center of the lens is typically at a distance of 1.07× radius of the lens. However, for the lens repeater application, the gain is not necessarily the key parameter. The return loss of the feed unit and the 3 dB beamwidth of the radiation pattern also need to be taken into consideration because of their effects on operational coverage.

In an alternative configuration, the feed unit may be spaced away from the lens surface, which may be provided with a matching layer to reduce surface reflections. Such a matching layer is typically electrically one quarter-wavelength in thickness and is arranged to have a lower effective permittivity than the surface of the lens. As mentioned above, for the current application, the distance of the focal point from the center of the lens is typically 1.07× radius of the lens based on our simulation. That is, if the radius of the lens is 40 mm, then the feed unit is 1.07*40 mm=42.8 mm. Therefore, the feed unit is placed 2.8 mm from the surface of the lens.

A feed unit may provide operation for radio signals having a single polarization, for example +45-degree slant linear polarization or right-hand circular polarization. In further embodiments a feed unit may provide for two orthogonal polarizations, for example ±45-degree linear polarizations, or right-hand and left-hand circular polarizations, wherein preferably the corresponding ports of each feed unit are mute ally connected by guided transmission media.

It is noted that any suitable spherical lens 39 can be utilized in the repeater 32 including, for example in one embodiment, a prior art spherical lens antenna known as a Luneberg lens, which is formed from dielectric material whose permittivity varies such that the permittivity at the surface of the lens is lower than that at the center of the lens. However, it has been found that a spherical lens formed from material having a uniform permittivity also provides satisfactory operation for the present application. The spherical lens is preferably formed from a dielectric material having a low loss factor at the operating frequency, for example polyethylene, polystyrene and variants thereof. The properties of Rexolite, a cross-linked co-polymer of polystyrene and divinyl-benzene have been found to be particularly advantageous for this application. With a lens repeater, we can use any type of lens, regardless of the level of sidelobe suppression. The repeater works equally well whether the sidelobes are of a high level or not. The purpose of the lens repeater is to grab a signal and redirect it. The lens could be of the Luneberg type where it is expensive since the dielectric constant varies from the inner to the outer of the sphere or a simple low cost constant dielectric lens. The novelty of the application is that is a single lens can be turned into a repeater by connecting the various feeds together so that there is a donor beam and a service beam.

The lens may be manufactured by machining or molding processes, or by the use of an additive manufacturing process. The use of an additive manufacturing process provides a practicable method by which graded permittivity may be obtained, for example by the use of two or more different materials laid down with variable ratios, or the use of variable proportions of a powdered filling material with a high permittivity, such as quartz or alumina. The use of an additive manufacturing process also facilitates the provision of a surface matching layer having a permittivity lower than that of the interior of the lens by the inclusion of a suitable matrix of voids having dimensions small compared with a wavelength.

For operation at a frequency of 39 GHz, it is found that a suitable diameter for a lens formed from Rexolite is between 80 mm and 91 mm. Such an antenna provides donor and service beams having 3 dB beamwidths of approximately 5.2°-6.2° degrees and a gain between approximately 28 dBi and 29 dBi for donor and service beams. The efficiency of a passive repeater according to the present disclosure is typically 80 percent, including the efficiencies of both donor and service antennas and an interconnecting waveguide.

For some applications the lens may be partially truncated or may have a cylindrical rather than spherical shape. These simplifications of shape may reduce the cost of production but may also result in restrictions in the choice of angular separations between beams in either or both the azimuth and elevation planes. It may be mechanically convenient to provide flat surfaces at the top and bottom of the spherical lens.

Figure 3:
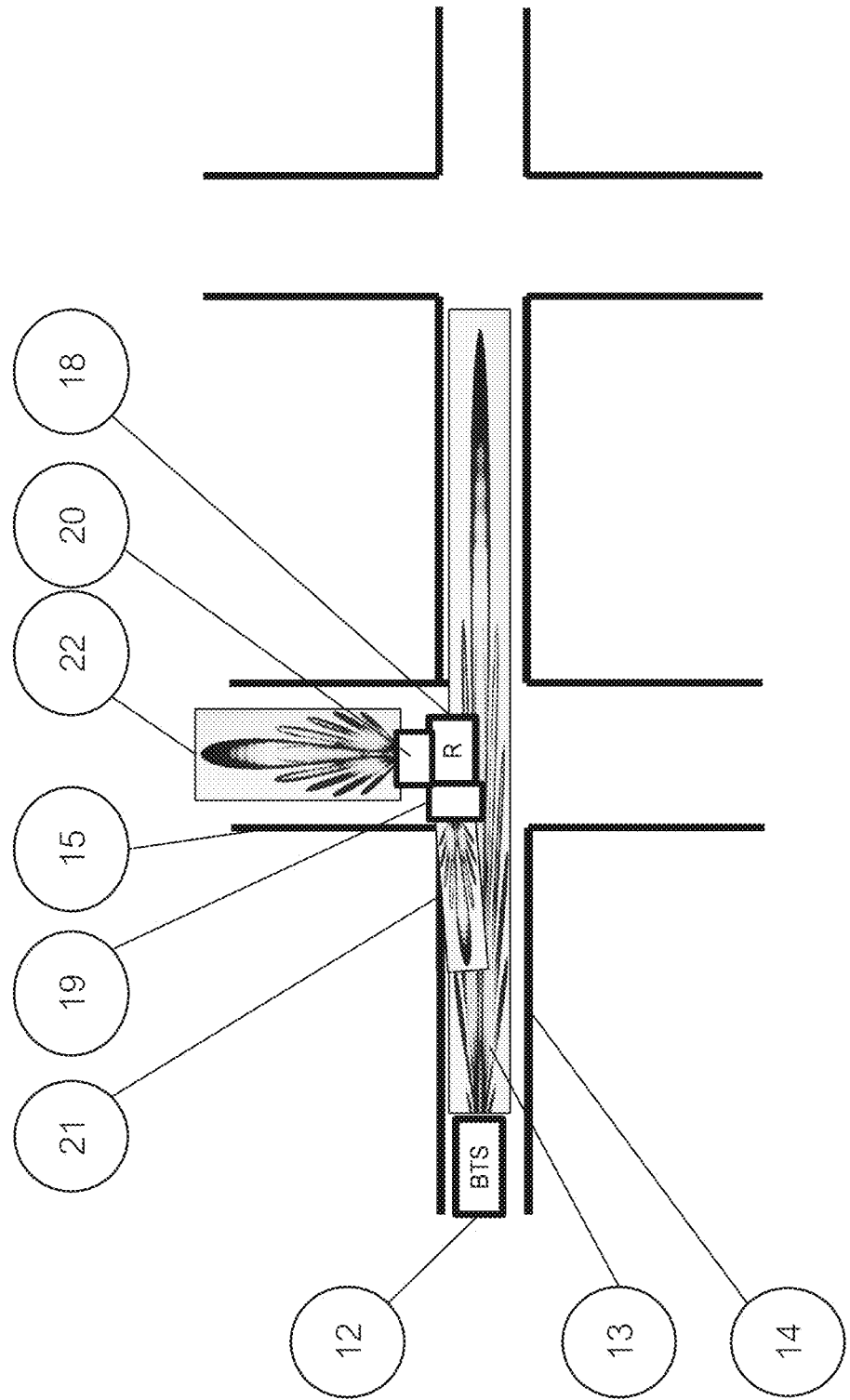
FIG. 3 is a diagram showing the plan view of a block of city streets with a base station and a passive repeater together providing coverage to a main street and a side.
Figure 7:
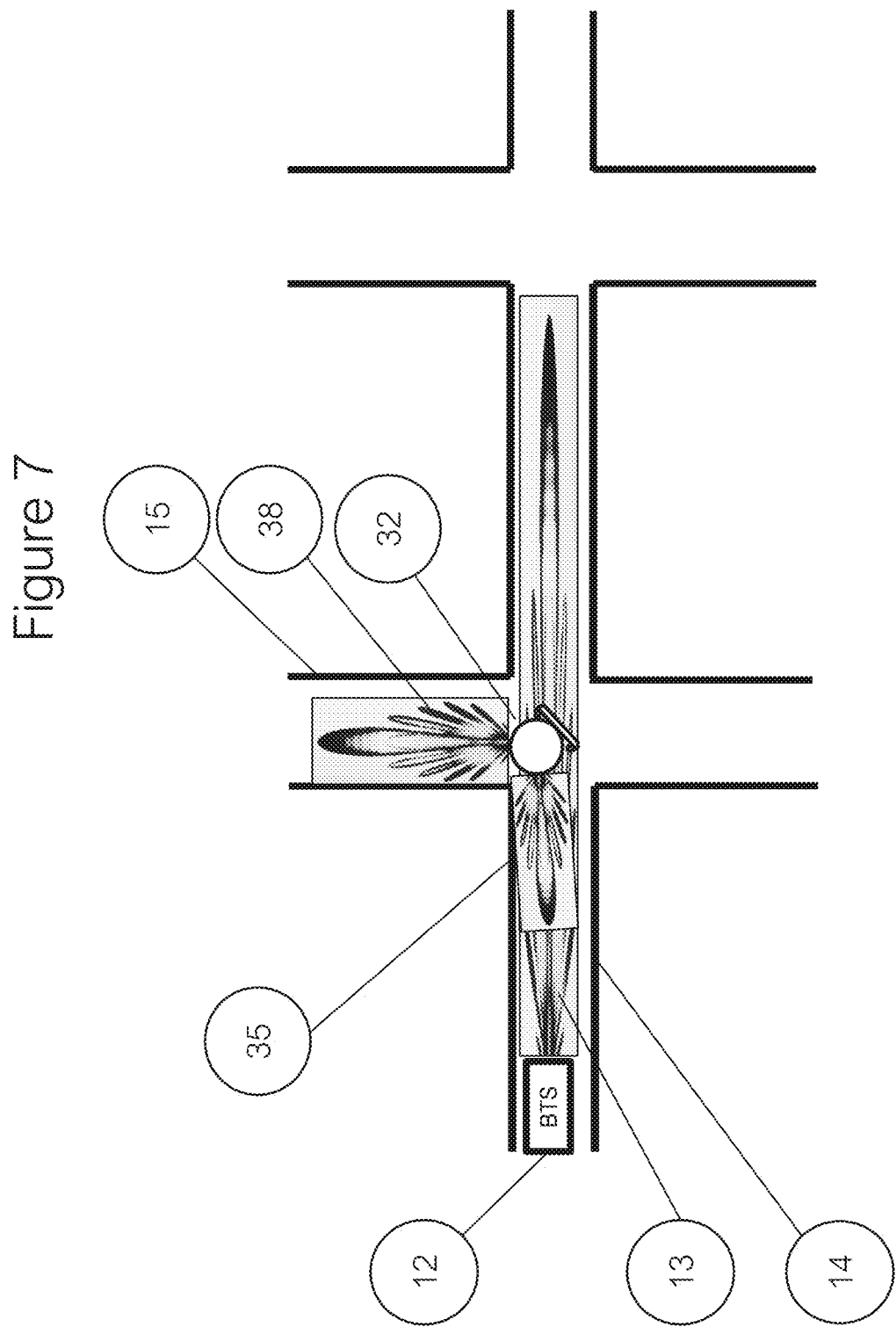
FIG. 7 illustrates the use of a passive repeater according to the present disclosure to provide service in a side street that is not illuminated by a base station located in a main street.

FIG. 7 shows the same view of a typical city block as FIG. 3. However, in this case a passive single lens repeater 32 extends the coverage of the base station. Base station 12 provides beam 13 beam along street 14. Repeater 32 provides donor beam 35 and service beam 38 along street 15.

Figure 8:
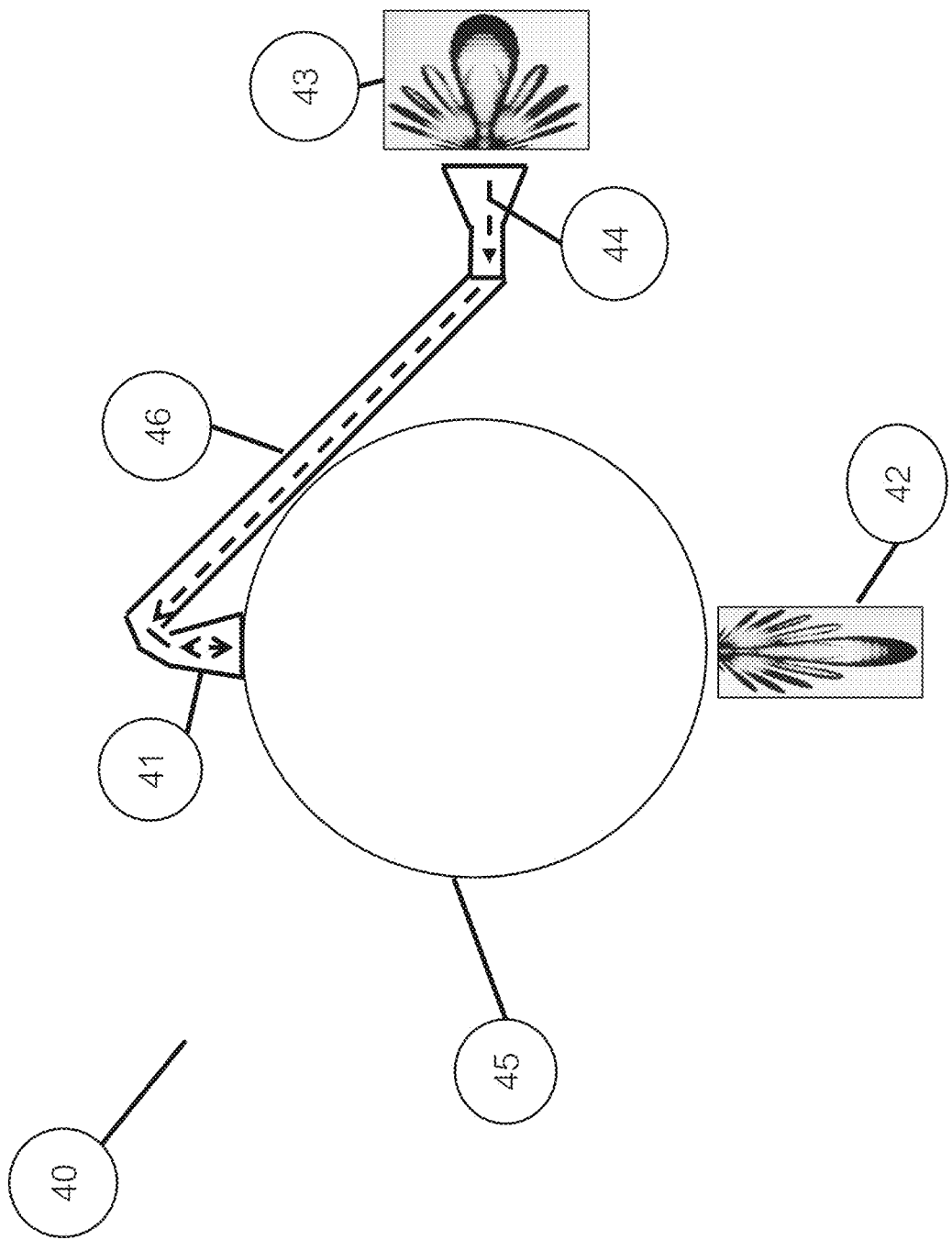
FIG. 8 shows a further embodiment of the disclosure wherein a lens antenna, having a spherical lens and a feed unit, acts as a donor antenna and a horn antenna acts as a service antenna.

FIG. 8 shows a further embodiment of the disclosure wherein the feed unit supporting the donor beam 42 is a horn 41, as in FIG. 6, but the service beam 43 is provided by an antenna 44 independent of the lens 45 and having a wider beamwidth in at least one plane. The wider beamwidth of the service beam may enable coverage of an area extending from the repeater and subtending a larger angle than would be the case for a long narrow area such as a single street. In this repeater system 40, suitable antennas to support the service beam include horn antennas or arrays of patch or dipole elements. The donor feed 41 is connected to the service feed 43 by a transmission medium like waveguide 46 or other mediums like coaxial lines or microstrip tracks.

It will be understood that in the case of a repeater having a lens provided with donor and service feed horns, as illustrated in FIG. 6, the beamwidths of both donor and service beams will be substantially identical. In some circumstances this may not match the operational requirement; the arrangement of FIG. 8 allows the beamwidths of the donor and service beams to be chosen independently and substantially different.

It will be understood that, in the case of a passive repeater, the total power available for the service beam 43 is determined by the power flux provided by the donor base station at the location of the repeater 40, together with the gain of the lens antenna; this total power may then be radiated over the desired area of coverage of the service beam. In circumstances in which additional power is required in a either a donor beam 42 or a service beam 43, a bidirectional amplifier may be inserted into a guided transmission medium connecting a donor feed unit and a service feed unit.

Figure 9:
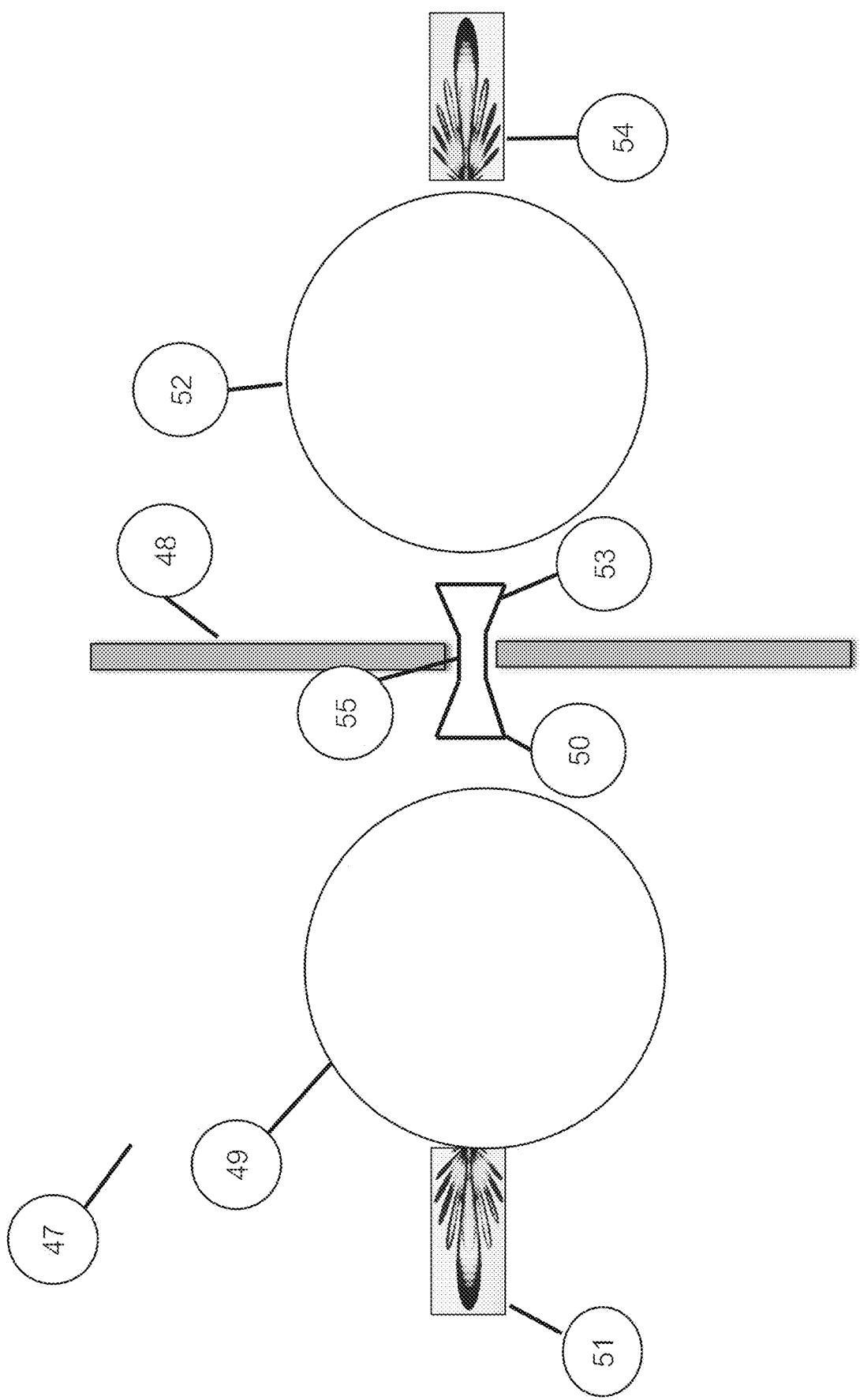
FIG. 9 shows a further embodiment of the disclosure wherein two lens antennas are used to enable signals from an external base station to be distributed inside a building.

Millimeter-wave signals have little ability to penetrate wall or even glass windows. FIG. 9 shows a two-lens repeater system 47 enabling coverage in an area where coverage would otherwise have been blocked, for example by a wall or a window 48. Lens 49 in conjunction with feed unit 50 supports a donor beam 51 connecting the repeater to the nearest base station, while lens 52 in conjunction with feed unit 53 provides the service beam 54, feed units 50 and 51 being mutually connected by means of a guided transmission medium 55, which may take the form of a waveguide or coaxial cable. It will be understood that the angle between the directions of the donor beam 51 and service beam 54 may be chosen to suit the geometry of the application and that a similar configuration may be realized using an alternative service antenna such as is shown in FIG. 8. The transmission medium 55 has a first end that is coupled with the first feed unit 50 and a second end opposite the first end that is coupled with the second feed unit 53. The transmission medium 55 extends through or past the object 48, such as through an opening, such that the first end of the transmission medium 55 is on one side of the object and the second end of the transmission medium 55 is on an opposite side of the object. This enables a the donor beam 51 to be transmitted from the first lens 49, through the transmission medium 55 via the first feed unit 50, to the second feed unit 53 to form the service beam 54 via the lens 52 on the opposite side of the object 48.

Figure 10:
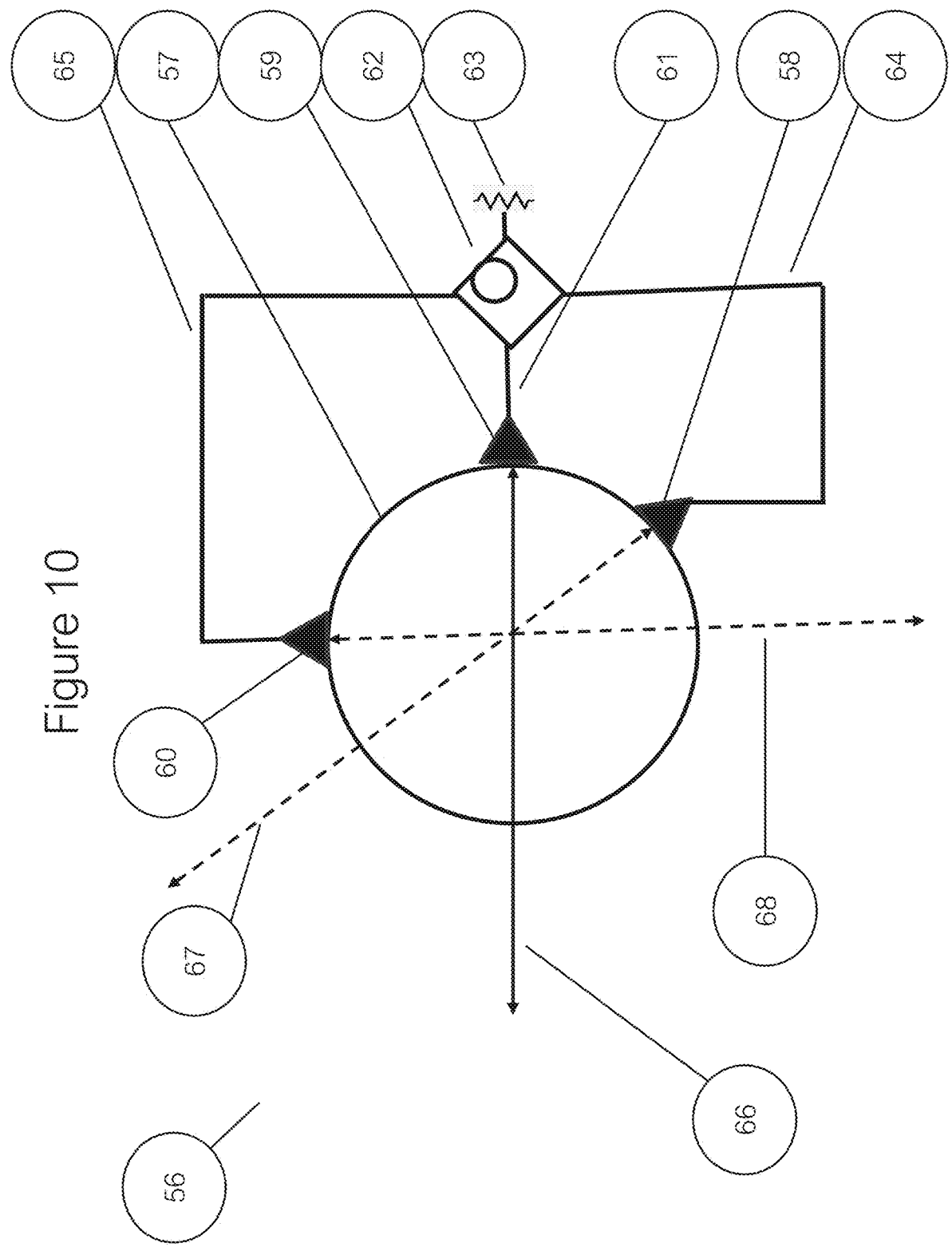
FIG. 10 illustrates a further embodiment of the disclosure wherein one spherical lens equipped with three feed units provides one donor beam and two independent service beams.

FIG. 10 shows a further embodiment of the disclosure wherein a substantially spherical lens 57 is provided with three feed units 58, 59, 60. Donor feed unit 59 is connected by guided transmission medium 61 to power divider 62. This may take the form of a hybrid junction, a Wilkinson power divider a 3 dB coupler or equivalent device, the port thereof isolated from the input port being terminated by matched termination 63. First and second outputs of the power divider 63 are mutually isolated from one another by virtue of the design of the power divider and are connected to service feed units 58, 60 by a guided transmission media 64, 65. This multi-output lens repeaters system 56 has a donor beam 66 and two service beams 67, 68. It will be understood that by the action of the three power dividers, signals received by the donor feed unit are divided into four equal parts, three of which are applied to service feed units and one to a terminating load. In a similar manner, signals received by a service feed unit are divided in to four equal parts, one of which is applied to the donor feed unit and the remaining three to terminating loads.

It will be understood that there is no restriction on the relative angles between the donor beam and either the first or second service beam other than that the feed units may not impinge upon on one another, and that the donor feed unit 59 and service feed units 58, 60 may be configured in any order round the circumference of the lens 57. Further, service feeds 58, 60 operate independently of one another so they are capable of operating concurrently.

Figure 11:
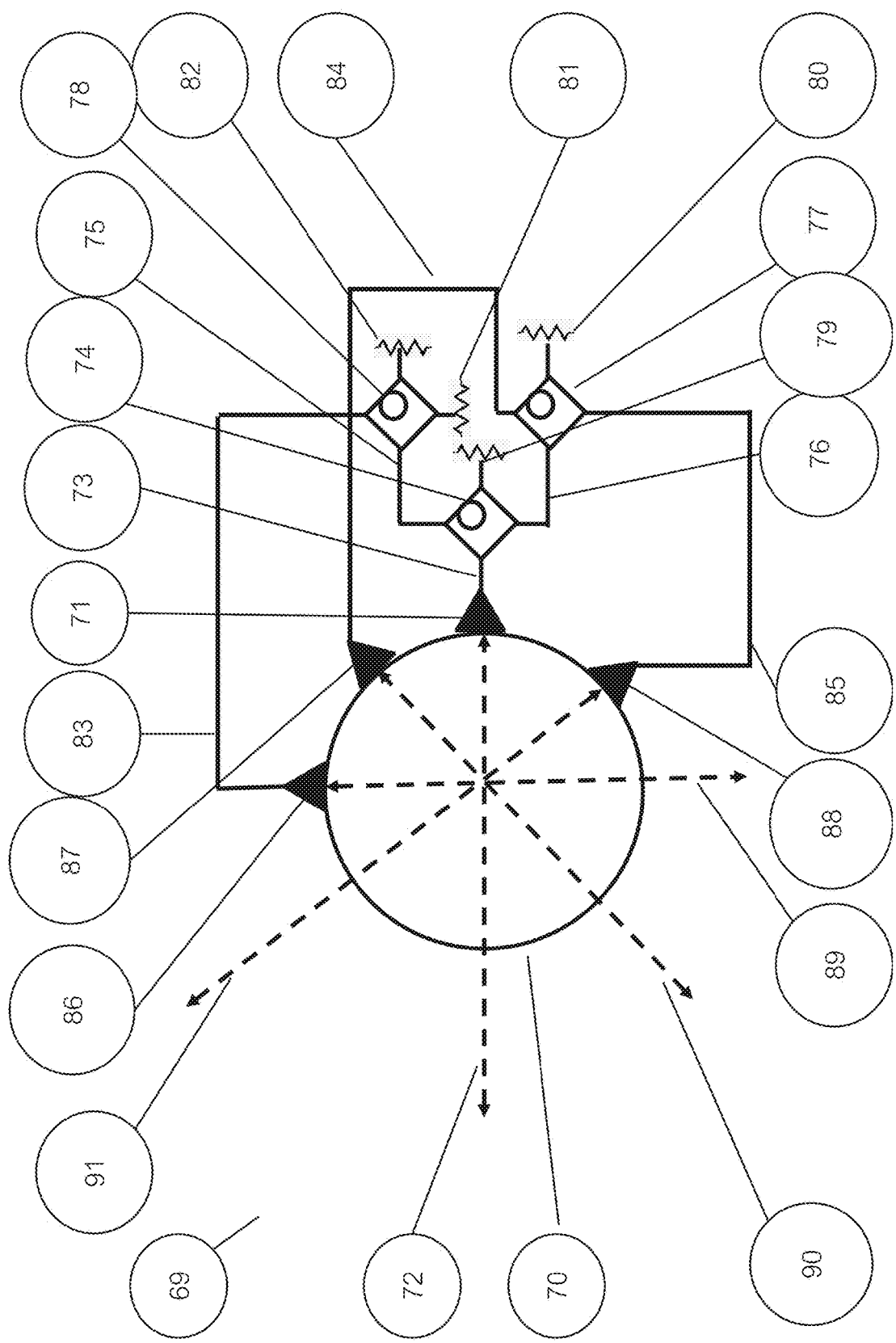
FIG. 11 illustrates a further embodiment of the disclosure wherein one spherical lens equipped with four feed units provides one donor beam and three independent service beams.

FIG. 11 shows the 4-feed arrangement for a repeater 69 of FIG. 10 extended to four feed units wherein a lens 70 is provided with a donor feed unit 71 providing donor beam 72 is connected by means of first transmission line 73 to a passive power division network having a first isolated power divider 74, intermediate transmission lines 75, 76, second and third isolated power dividers 77, 78, and matched terminations 79, 80, 81, 82. Further transmission lines 83, 84, 85 connect the said power division network to first, second and third service feed units 86, 87, 88 providing service beams 89, 90, 91 respectively. It will be understood that signals passing through this network between donor feed unit 71 and any of service feed units 86, 87, 88 will suffer an attenuation of 6 dB because only one quarter of the signal received by donor feed unit 71 reaches each of the said feed units. The same attenuation is encountered by signals received by the service feed units and passed through the network to the donor feed unit.

Provided that the feed units 71, 86, 87, 88 are physically small compared with the diameter of lens 70, there is substantial freedom in the choice of positions for the feed units and correspondingly for the relative angles between the donor beam and the service beams. Feed units may be placed immediately next to one another, or may be spaced around the lens. In a passive repeater the isolation between feed units is not important in itself, but some degree of blockage will be caused if a feed unit obstructs the signals in a beam formed by another feed unit, causing, loss of gain and distortion of the radiation pattern of the obstructed beam, but these effects may be small and acceptable in service. Service feeds 86, 87, 88 operate independently of one another so they are capable of operating concurrently.

In one embodiment, the passive power division network is a reciprocal network which passes signals received by the donor feed unit to each of the service feed units and likewise passes signals received by each of the service feed units to the donor feed unit. In each direction the loss through the power division network is 6 dB. The power divider network may be extended to provide further isolated ports.

Figure 12:
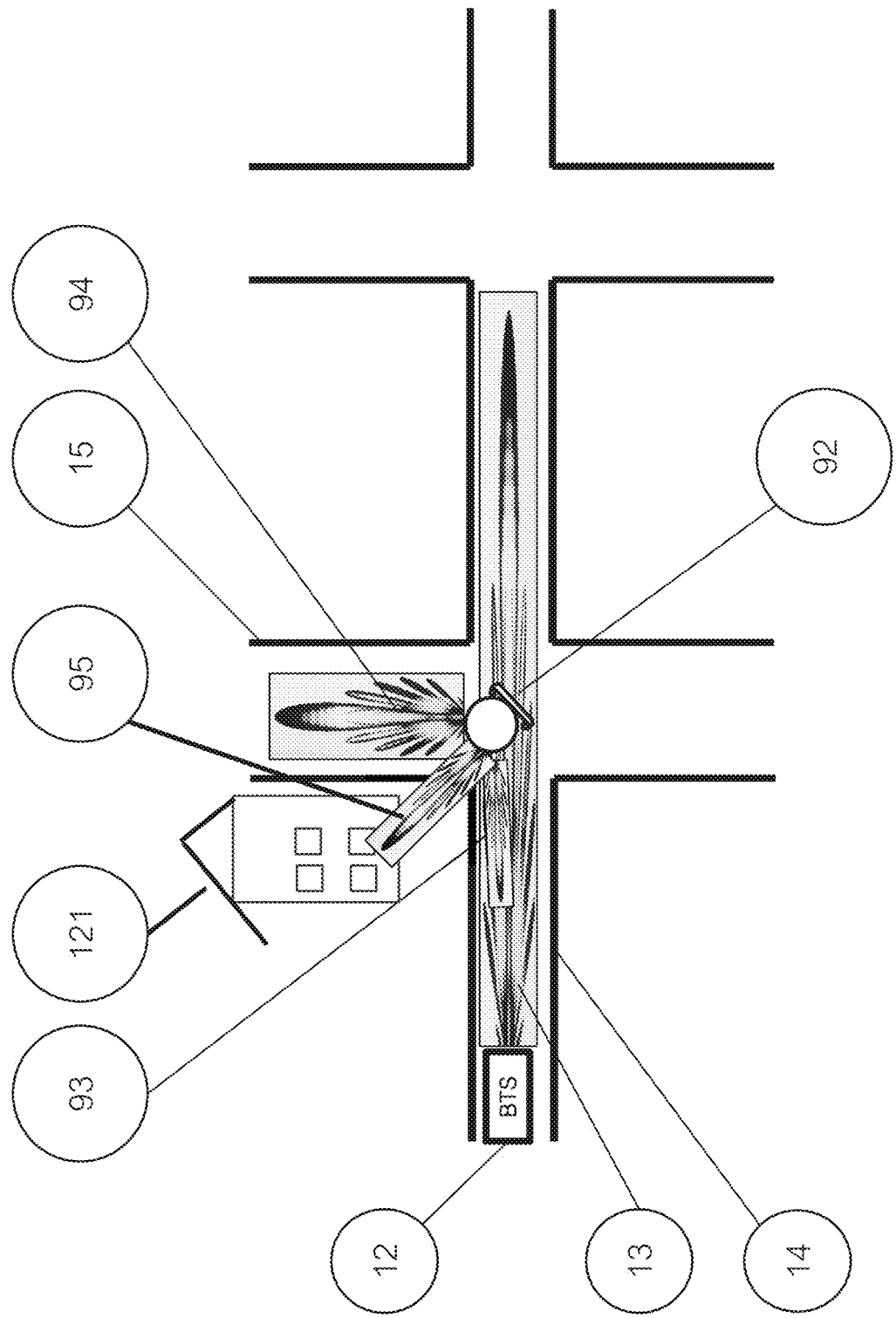
FIG. 12 illustrates an application of the passive relay arrangement of FIG. 11 to provide coverage in an urban situation.

FIG. 12 is a diagrammatic representation of a typical application of a multi-beam passive repeater wherein a multi-beam lens repeater 92 supports donor beam 93 communicating with base station 12 having beam 13 along street 14. Multi-beam lens repeater 92 further supports service beams 94, 95 directed along street 15 and towards building 121 respectively.

Figure 13B:
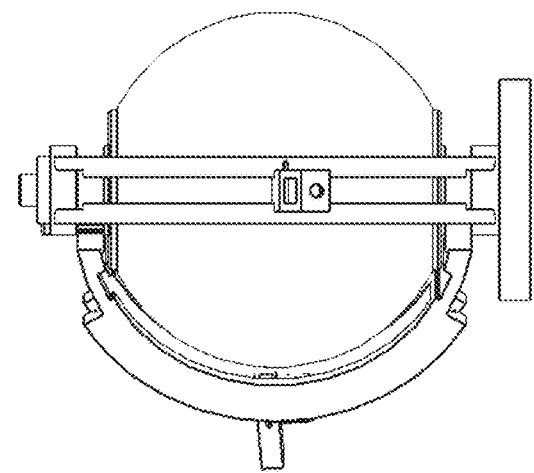
FIG. 13(b) shows the fully assembled view of FIG. 13(a)
Figure 13A:
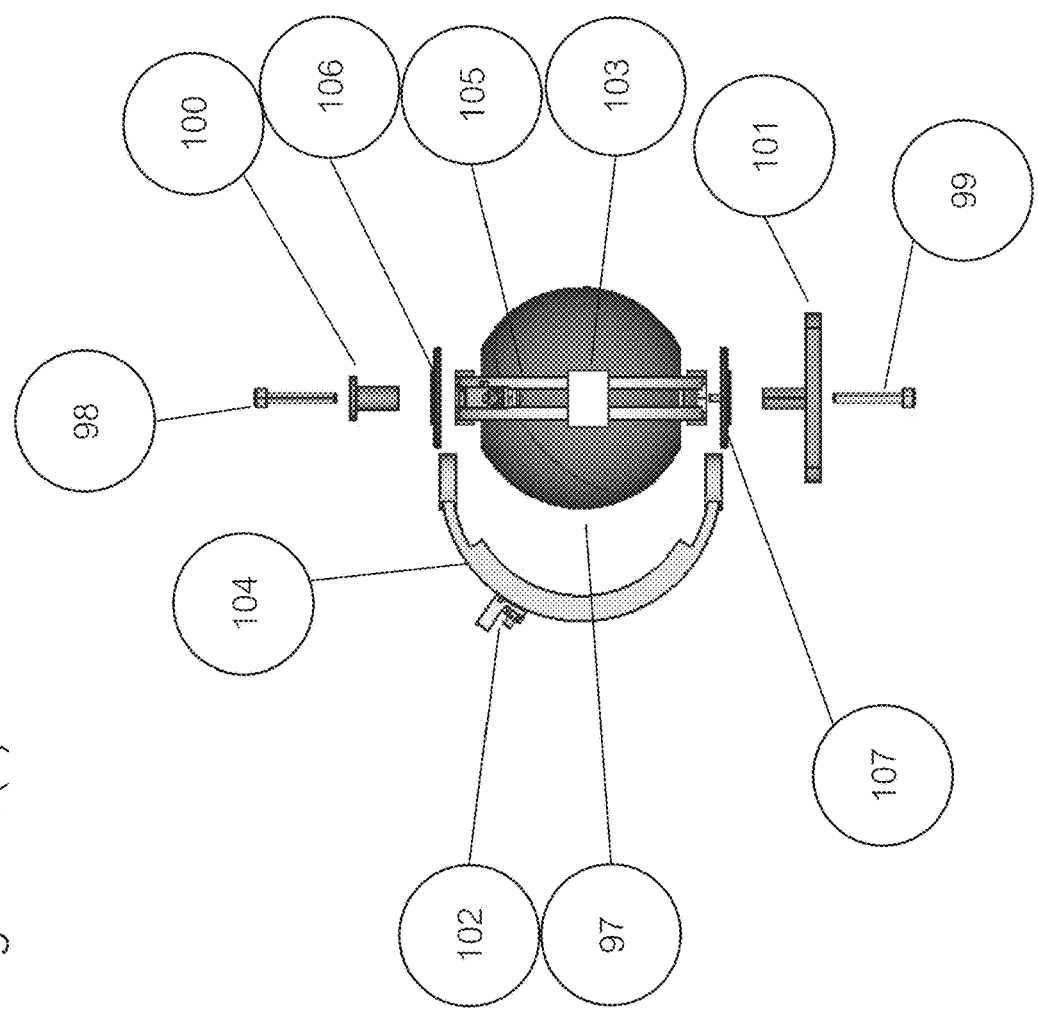
FIG. 13(a) shows an exploded side view of embodiment of the present disclosure.

FIG. 13(a) shows the exploded view of the mechanical features of an embodiment of the present disclosure. FIG. 13(b) shows the assembled view of FIG. 13(a). Feed units 102, 103 are slideably attached to first and second arcuate support members 104, 105 respectively. Arcuate member 104 may be positioned at any longitude relative to the rotational axis defined by plastic collars 100, 101 and any latitude relative to the spherical lens 97 subject to avoiding contact with arcuate support member 105 and feed unit 103 supported thereby. In a similar way, arcuate member 105 may be positioned at any longitude on the spherical lens 97 relative to the rotational axis defined by shafts 98, 99 and any latitude relative to the spherical lens 97 subject to avoiding contact with arcuate support member 104 and feed unit 102 supported thereby.

Substantially laminar members 106, 107 may be attached to arcuate members 104, 105 and provided with angular scales indicating azimuth bearings. Arcuate support members 104, 105 may also carry scales indicating the relative elevation angles of feed units 102, 103.

Arcuate support members 104, 105 and laminar members 106, 107 are held to the lens 97 by plastic collars 100, 101 and then attached to the lens by tightening the screws 98, 99 into the tapped holes in the lens 97 which extend only a few millimeters into the lens. In some embodiments lens 97 may conveniently be provided with diametrically opposed flat surfaces to which laminar members 106, 107 may be mounted.

Figure 14:
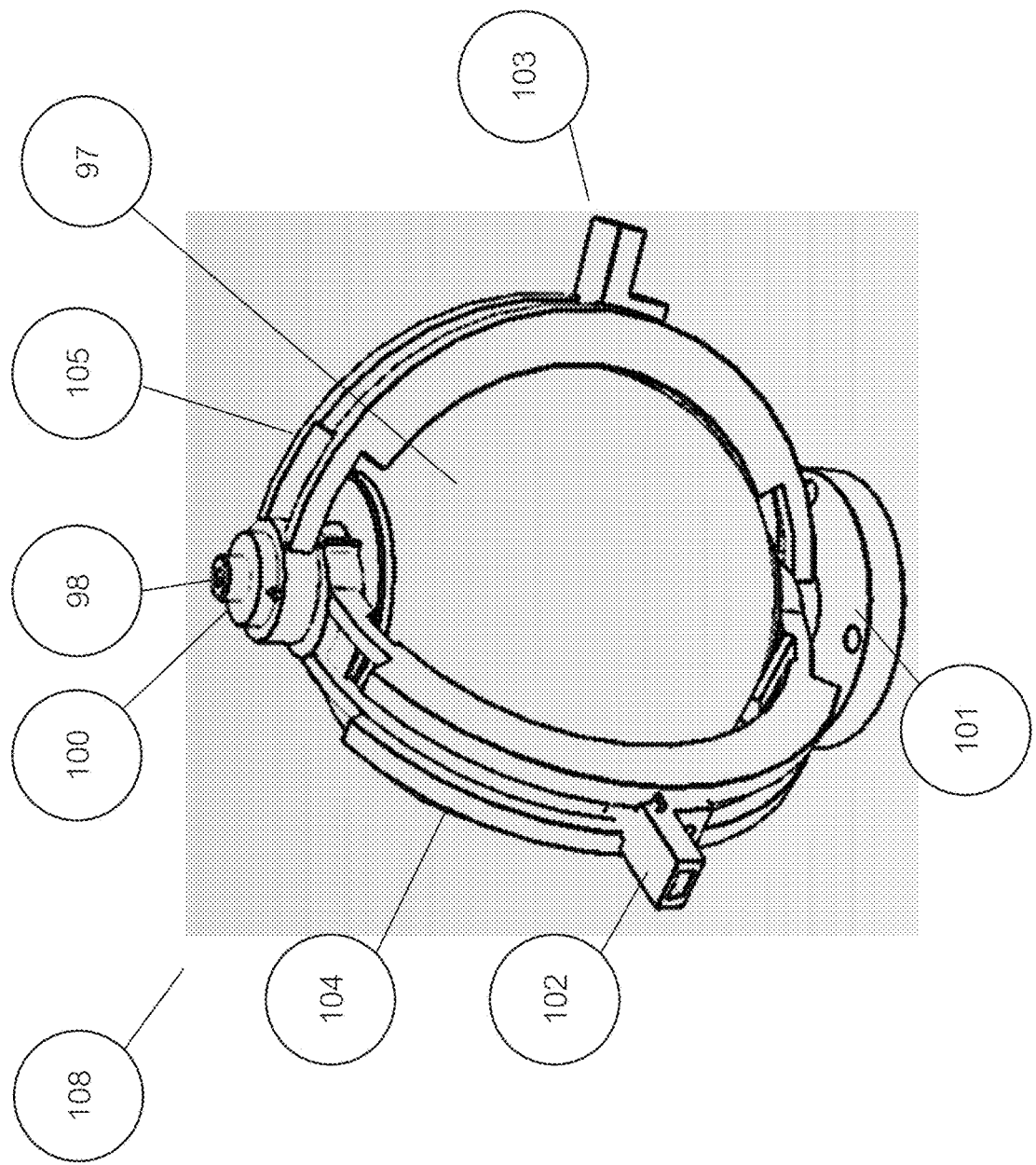
FIG. 14 shows an isometric view of the lens repeater according to the present disclosure.

FIG. 14 shows an isometric view of an embodiment of a passive lens repeater 108 according to the present disclosure. Feed units 102, 103 are slideably mounted on arcuate support members 104, 105 respectively, Support members 104, 105 are rotatably mounted on support collar 100 held down by a screw 98 extending a few millimeters into the lens 97 and support collar 101 held in place by screw 99 (not shown here but shown in FIG. 13(*a*)) extending a few millimeters into the lens. Locking arrangements may be provided such that the feed units 102, 103 may be fixed in position on support members 100, 101, which in turn may be fixed in angular position relative to the mounting arrangement 101. To reduce their effect on the signals received and radiated by the lens 97, the arcuate support members 104, 105 are preferably made from dielectric material.

It should be understood that the feed units 102, 103 are preferably mutually interconnected by means of a flexible waveguide (not shown) of sufficient length to permit a wide range of adjustment of their mutual positions.

Arcuate members 104, 105 preferably have constant cross-sectional shape chosen to permit the engagement of feed units 102, 103, to allow their free and independent movement along members 104, 105. They may, for example, be a pair of channel sections spaced apart to accommodate a feed unit between them and oriented with their toes facing one another such that an opening is provided between them within which a feed unit may be slideably attached. Each feed unit 102, 103 may be provided with a locking screw or clamp to secure it in place on member 104, 105 respectively, the position of each feed unit being independent of the other and selected to provide the required relative directions of corresponding service and donor beams (not shown). The ends of members 104, 105 may be shaped to permit the free movement of the said members such that feed units 102, 103 can be positioned as close together as possible. Members 104, 105 are preferably made of dielectric material to reduce the extent to which they may obstruct or scatter radio signals are rotatably connected to lens 97 by attachment members 100, 101 and screws 98,99.

For the 80 mm lens from 24 GHz-40 GHz, the distance of the feed unit is 2.8 mm from the lens surface. The feed unit can sit flush with the lens surface or typically a distance of 1.07× radius of the lens from the center of the lens. The cut at the top and bottom of the lens 97 is to allow members 106,107 to be placed on a flat surface. It can be cut 5 mm from the top and 5 mm from the bottom.

Figure 15:
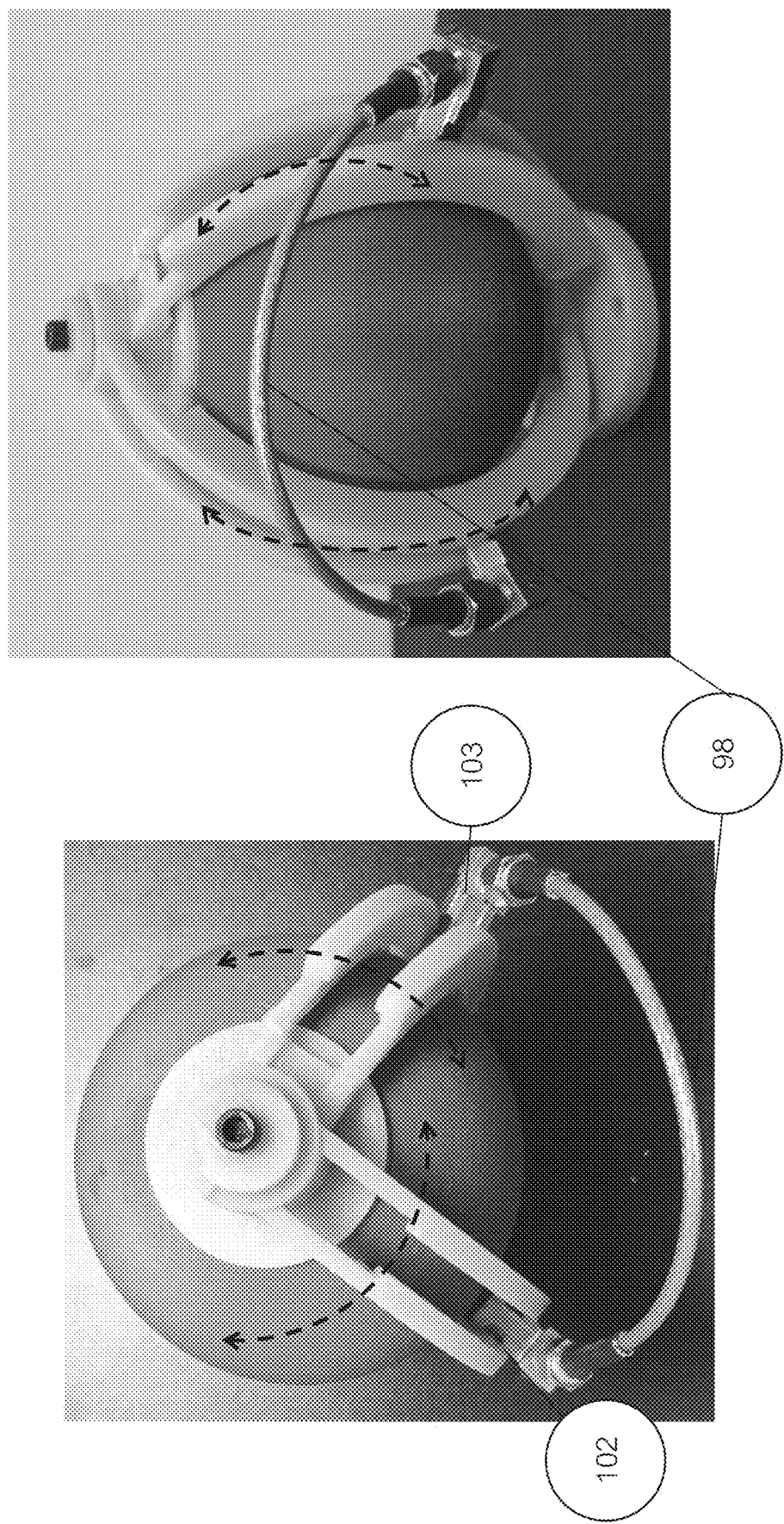
FIG. 15(a) shows a top view of the arrangement shown in FIG. 14 and indicates the directions of adjustment of first and second arcuate feed unit support members.
FIG. 15(b) is a further view of the arrangement shown in FIG. 14 indicating the direction of movement of the feed units with respect to their arcuate support members.

FIG. 15*a* and FIG. 15*b* show the arrangement of FIG. 14 but with a transmission medium, in this case a coaxial cable 98 connecting the feed units 102, 103 thereby creating a lens repeater according to the present disclosure with beams capable of being varied in three dimensions (3D) for both the Donor and Service feed units. FIG. 15(*a*) shows a top view of the arrangement shown in FIG. 14 and indicates the directions of adjustment of first and second arcuate feed unit support members. FIG. 15(*b*) is a further view of the arrangement shown in FIG. 14 indicating the direction of movement of the feed units with respect to their arcuate support members.

FIG. 16(*a*) shows a feed unit having a waveguide with internal matching steps as seen in isometric views in FIG. 16(*b*) and FIG. 16(*c*). A feed unit having this design with an interface dimensioned to match waveguide WR42 is operable between 24 GHz and 40 GHz.

FIG. 17 shows the measured return loss for a lens 97 that is 80 mm in diameter excited by either feed unit 102 or 103 over the wide frequency range 24-40 GHz. This measured return loss return is applicable for both the donor and service.

Figure 18:
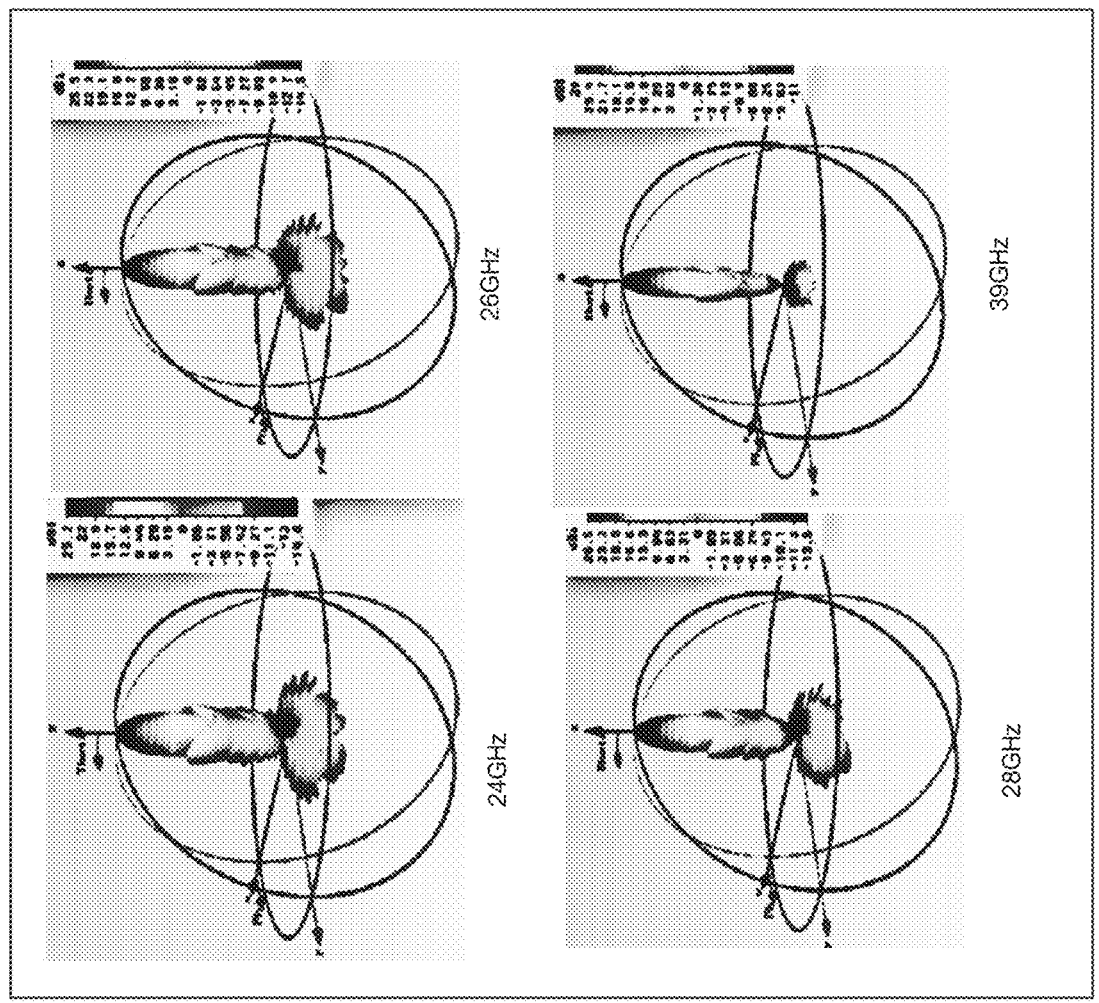
FIG. 18 shows computed radiation patterns of a lens antenna provided with a feed unit as shown in FIG. 17.

FIG. 18 shows radiation patterns with their corresponding gain figures for a lens 97 with a diameter of 80 mm and excited by feed units 102 or 103 as shown in FIG. 17, computed at frequencies from 24 GHz to 38 GHz. It will be seen that the patterns are well shaped over this wide frequency range.

Figure 19:
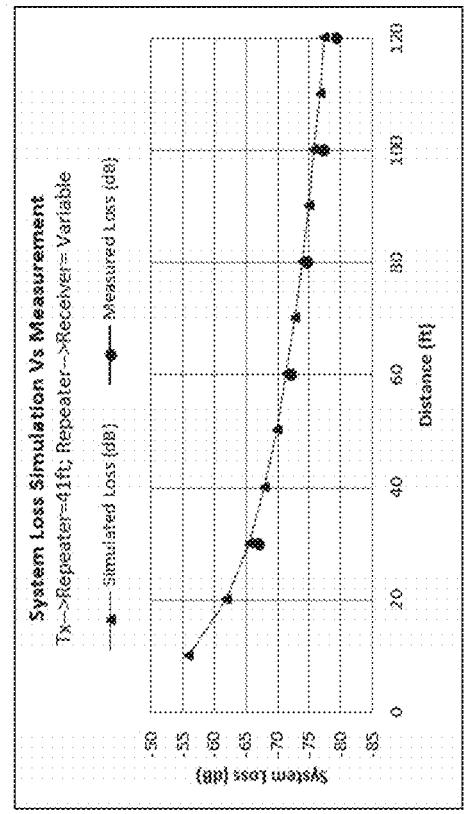
FIG. 19(a) Shows a passive repeater according to the present disclosure situated between substantially orthogonal transmission paths.
FIG. 19(b) shows a graph of the simulated versus measured system loss data of the setup shown in FIG. 19(a) as a function of distance along the second path provided by a passive lens repeater according to the present disclosure.
Figure 19:
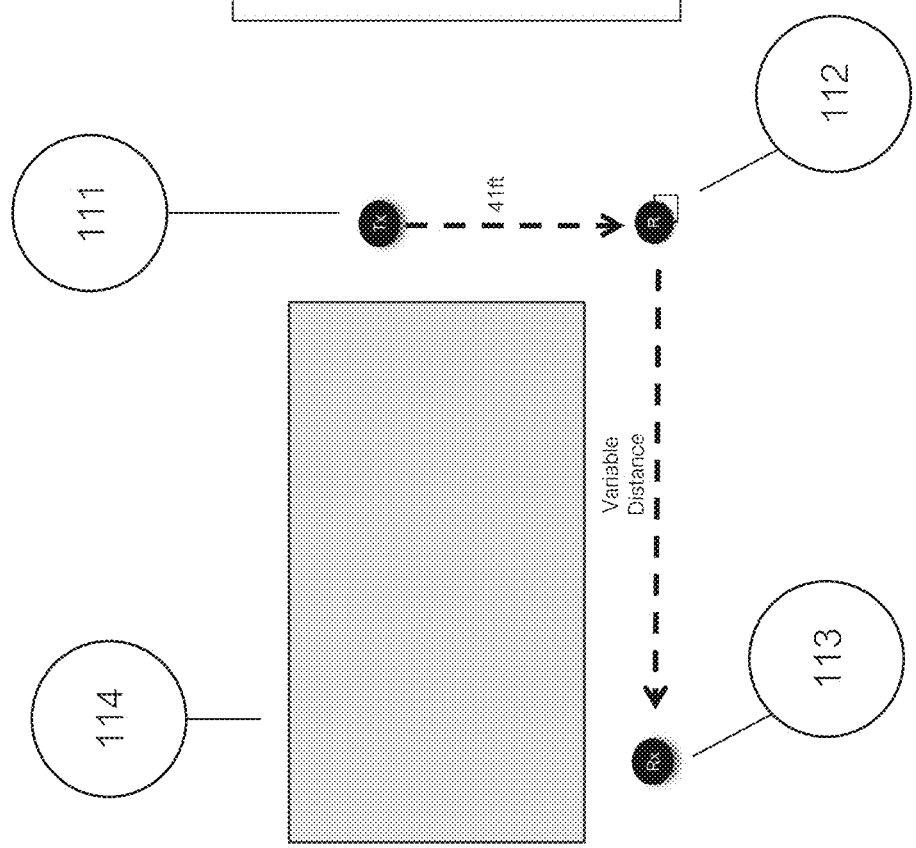

FIG. 19(*a*) shows a plan view of an experimental arrangement wherein a base station antenna 111 and a passive repeater according to the present disclosure 112 are positioned close to a rectangular obstruction 114 and separated from one another by a distance of 13 m (41 ft). A measurement antenna 113 was moved progressively away from the repeater 112 while the transmission loss between the base station antenna 111 and the measurement antenna 113 was measured. FIG. 19(*b*) is a graph showing good agreement between computed transmission loss and measured transmission loss as a function of the distance between the repeater 112 and the measurement antenna 113.

Figure 20:
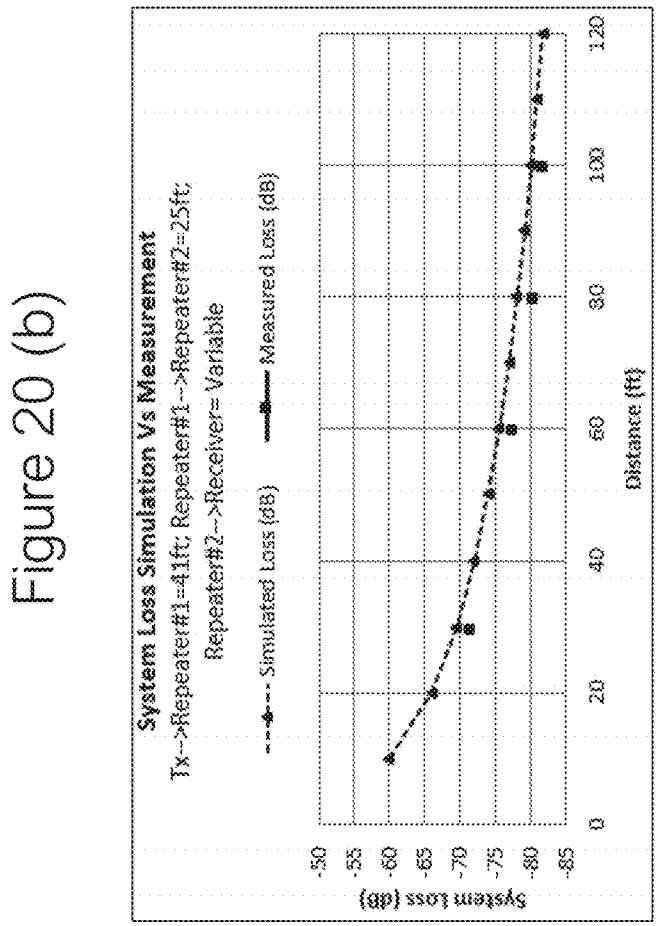
FIG. 20(a) shows first and second passive repeaters according to the present disclosure situated at corners of transmission paths each orthogonal to a first transmission path.
FIG. 20(b) shows a graph of the simulated versus measured system loss data of the setup shown in FIG. 20(a) as a function of the distance along the second path provided by a passive lens repeater according to the present disclosure.
Figure 20:
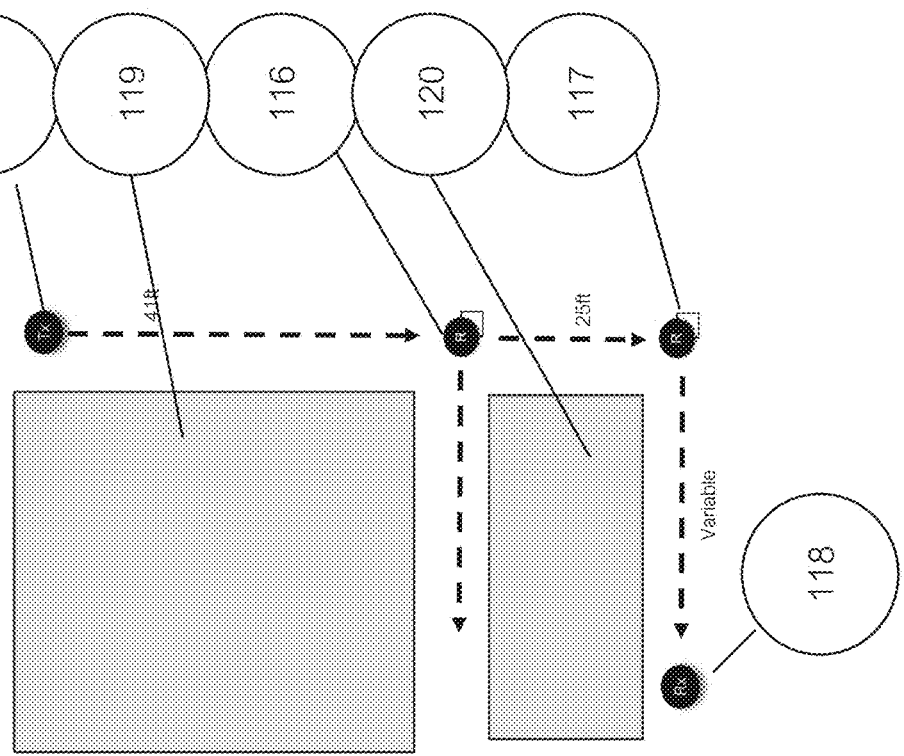

FIG. 20(*a*) shows a system having a base station antenna 115 and first and second passive lens repeaters 116, 117 according to the present disclosure, arranged in a straight line extending from base station antenna 115 and separated by obstructions 119, 120. The present disclosure is on the passive lens repeater but by connecting the donor and service feeds to a bi-directional amplifier circuit, this can be turned into an active repeater that operates in a similar operation to what we've described in the passive lens repeater but because it is amplified, it will allow large a larger reach/distance of coverage.

FIG. 20(*b*) shows the computed and measured transmission loss between the base station antenna 115 and a receiving antenna 118 placed at different distances from second repeater 117 of FIG. 20(*a*). Good agreement is seen between computed and measured values, demonstrating the practicability of the arrangement.

Figure 21:
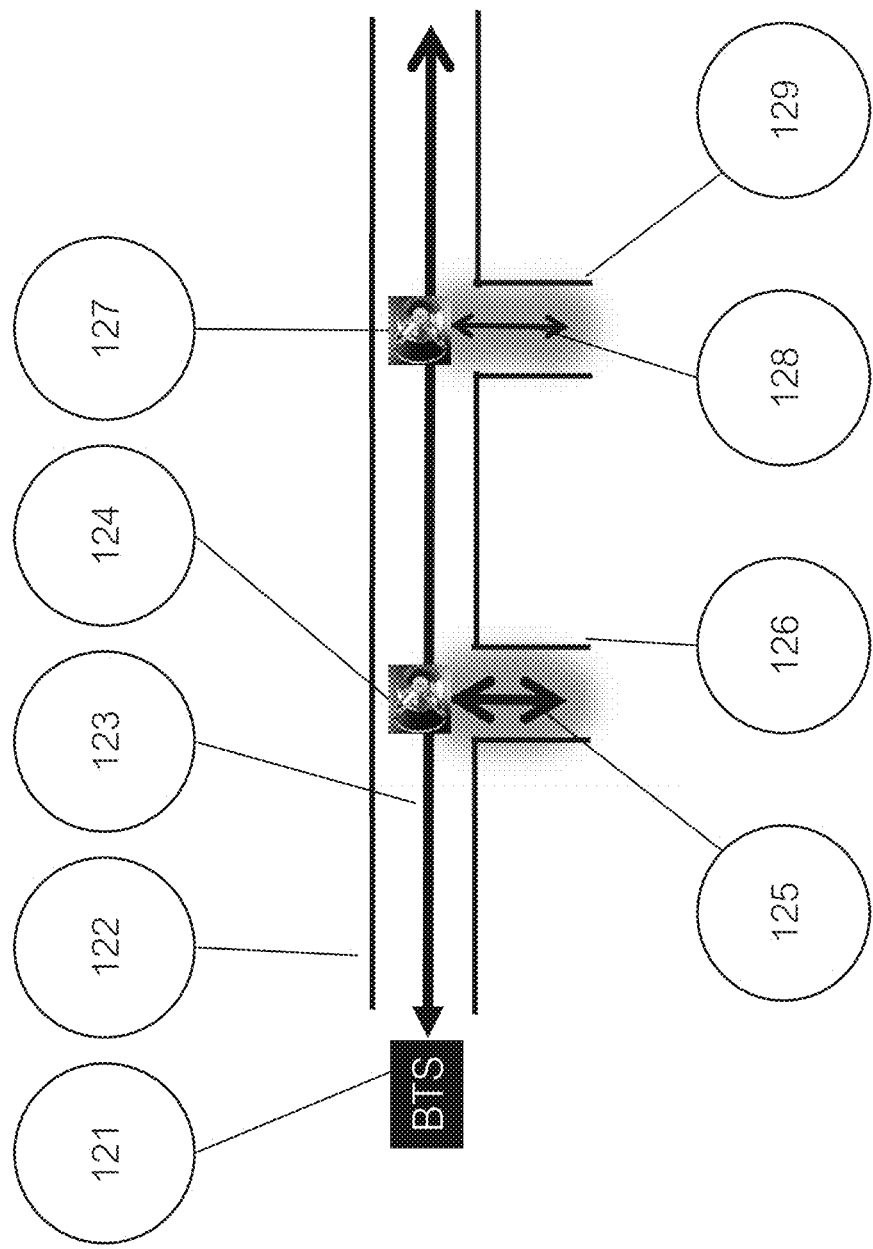
FIG. 21 shows a practical application of the path geometry show in FIG. 20(a) in an urban street environment.

FIG. 21 shows a practical application of the arrangement shown in FIG. 20(*a*) to providing millimeter-wave coverage into multiple side streets from a single base station. In FIG. 21, a millimeter-wave base station 121 supports service in street 122 by means of signal beam 123 which acts as a donor beam to a first passive repeater 124 according to the present disclosure. First repeater 124 supports a service beam 125 in first side street 126. Signal beam 123 also acts as a donor beam to second passive repeater 127 which supports service beam 128 in a second side street 129. Measurements indicate that the additional attenuation caused by placing a second passive lens repeater between a base station and a first passive lens repeater is typically between 2 dB and 3 dB.

FIG. 22(*a*) and FIG. 22(*b*) show an arrangement according to the present disclosure wherein a spherical lens 130 supports a plurality of donor feed units 131-133 and service feed units 134-136 each feed unit has a patch antenna, being disposed over the surface of spherical lens 130 and connected together by transmission lines 137-139. In such an arrangement, dependent on the permittivity of the spherical lens, it may be found that better beam shapes are obtained if the feed units are spaced from the surface of the lens by at least one conformal dielectric mounting spacer 140 whose function is to space the feed units from the surface of the lens to maximize gain and obtain radiation patterns of optimal shape. For a constant dielectric lens, the focal point is a few mm off the surface of the lens. This can be done by simulations and for our current application, it's approximately 1.07× radius of the lens. This provides the maximum gain for the lens antenna. However, as this is a repeater application, the spacer is designed through simulation to provide a compromise between gain, return loss and 3 dB beamwidth.

The arrangement shown in FIG. 22(a) allows three donor beams and three service beams to operate simultaneously, providing further operational flexibility.

FIG. 23 shows an embodiment of the present disclosure wherein spherical lens 141 is provided with a plurality of feed units 142-147, positioned on or slightly spaced from the surface of spherical lens 141 by a conformal dielectric spacer 149 with each feed unit 142-147 connected by means of a radio frequency transmission line to a multi-pole switch matrix 148 by the operation of which selected feed units may be connected together to act as donor feed units or service feed units, providing interconnected donor and service beams in the manner described herein before. Switch matrix 148 may be an array of semiconductor switches or MEMS (micro electromechanical) switches controlled by electronic circuit arrangements. These in turn may be remotely controlled such that the repeater described herein forms part of a self-optimizing network.

Figure 24:
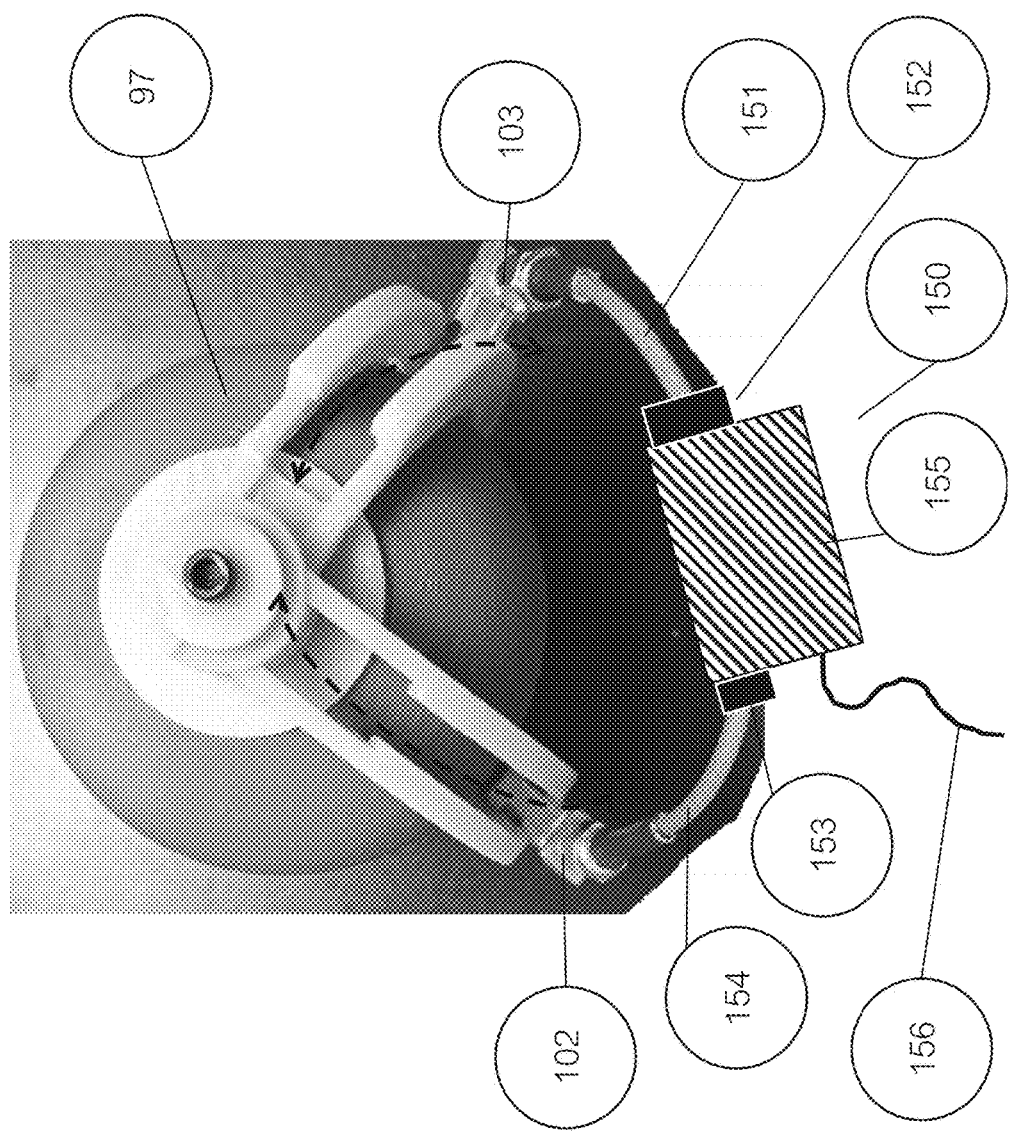
FIG. 24 shows an arrangement of FIG. 15(a) whereby the transmission lines are connected to a bi-directional amplification unit instead of directly between donor to service to turn a passive lens repeater into an active lens repeater with the same beam steering characteristics but with amplification for further coverage.

FIG. 24 shows an arrangement similar to FIG. 15(a) where the feed units 102, 103 are connected to bi-directional amplifier 150 thereby creating a very simple active lens repeater to allow for further coverage. Feed unit 102 with guided transmission medium 154 is connected to port 153 of bi-directional amplification unit 150 and feed unit 103 with guided transmission medium 151 is connected to the port 152. The bidirectional amplification unit contains electronic circuit arrangements such that for an input signal at port 152 a corresponding amplified output signal is delivered at port 153, while at the same time for an input signal at port 153 a corresponding amplified output signal is delivered at port 152. External connections to bi-directional amplification unit 150 may include a power input cable 156 and it may be provided with a heatsink 155. Control of the bidirectional amplification unit may be effected by control signals contained within those signals received from the donor base station.

The feed units may be single antenna elements such as horn or patch antennas as described herein before, or may have small arrays of groups of antenna elements. The relative phases and amplitudes of the excitations of such arrays may be arranged to modify the shape of the beam emerging from the lens antenna, or may be varied by means of phase shifting arrangement to allow the direction of the emerging beam to be over a range of angles dependent on the size of the array. Such control of the relative phases of currents in an antenna array, providing beamforming or beam steering capabilities may be provided by mechanical or electronic means.

It will be understood that the ease of configurability, low cost but high performance and small visual profile of a passive lens repeater according to the present disclosure facilitates its use with many different geometries of streets and service targets.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as spherical and orthogonal. These terms are not intended to limit the disclosure and, in general, are used for convenience to facilitate the description based on the examples shown in the figures. In addition, the geometric or relational terms may not be exact. For instance, beams or feed units may not be exactly orthogonal to one another because of, for example, practical implementations and tolerances, but may still be considered to be orthogonal.

The invention claimed is:

1. A repeater comprising:
a substantially spherical dielectric lens antenna;
at least one donor feed unit supporting transmission and reception of signals through said lens antenna; and
at least one service feed unit supporting transmission and reception of signals through said lens antenna;
a passive radio frequency power division network having at least one input port and a plurality of output ports, the at least one input port being mutually coupled to each of the plurality of output ports and the plurality of output ports being mutually isolated from one another;
a first guided transmission medium having a first end connected to a donor feed unit and a second end connected to an isolated port of the said power divider; and
a further set of guided transmission media each having a first end connected to a service feed unit and a second end connected to an isolated port of said power divider.

2. A repeater according to claim 1, further comprising at least one amplifying device or electronic circuit arrangement connected by at least one of said first guided transmission medium and said further set of guided transmission media.

3. A repeater according to claim 1, wherein said at least one service feed can be placed around an outer profile of the lens antenna to form a service beam in any direction.

4. A repeater according to claim 1, further comprising at least one array with circuit arrangements at either or both of the at least one donor feed unit and said at least one service feed unit to provide beamforming and beam steering capabilities.

5. A repeater according to claim 1, wherein a plurality of donor feed units and a plurality of service feed units are disposed at a surface of the spherical dielectric antenna, each of said plurality of donor feed units being connected by a guided transmission medium to at least one service feed unit, thereby concurrently providing multiple donor beams and multiple service beams.

6. A repeater according to claim 1, wherein at least one donor feed unit and at least one service feed unit are connected by the first guided transmission medium or the further set of guided transmission media to a switching arrangement thereby enabling the routing of signals between said donor feed units and service feed units to be selected as required to meet changing operational requirements.

7. A repeater according to claim 1, wherein the said first guided transmission medium or said further set of guided transmission media comprise one or more of a rigid waveguide, a flexible waveguide, a coaxial cable or a microstrip transmission line.

8. A repeater according to claim 1, wherein the substantially spherical lens antenna is provided with a surface matching layer having a permittivity arranged to enhance the matching between the said lens antenna and said at least one service feed unit.

9. A repeater according to claim 1, wherein the material forming the lens antenna is arranged to have a permittivity which varies as a function of a radius from the center of the lens antenna.

10. A repeater according to claim 1, wherein the material forming the lens antenna has a constant permittivity.

11. A repeater according to claim 1, wherein the lens antenna has a truncated substantially spherical shape.

12. A repeater according to claim 1, wherein the lens antenna has a substantially cylindrical shape.

13. A repeater according to claim 1, further comprising at least one amplifying device or electronic circuit arrangement connected by at least one of the said guided transmission media.

14. A repeater according to claim 1, further comprising a first service feed unit forming a first service beam in a first direction and a second service feed unit forming a second service beam in a second direction different from the first direction.

15. A repeater according to claim 1, wherein said donor feed is placed around an outer profile of the lens antenna to form a donor beam in any direction.

16. A repeater according to claim 1, wherein said antenna comprises a lens antenna.

* * * * *